(12) United States Patent
Strong et al.

(10) Patent No.: US 9,883,040 B2
(45) Date of Patent: Jan. 30, 2018

(54) FRAUD DETECTION IN INTERACTIVE VOICE RESPONSE SYSTEMS

(71) Applicant: PINDROP SECURITY, INC., Atlanta, GA (US)

(72) Inventors: Scott Strong, Atlanta, GA (US); Kailash Patil, Atlanta, GA (US); David Dewey, Atlanta, GA (US); Raj Bandyopadhyay, Atlanta, GA (US); Telvis Calhoun, Canton, GA (US); Vijay Balasubramaniyan, Atlanta, GA (US)

(73) Assignee: PINDROP SECURITY, INC., Atlanta, GA (US)

( * ) Notice: Subject to any disclaimer, the term of this patent is extended or adjusted under 35 U.S.C. 154(b) by 0 days.

(21) Appl. No.: 15/294,538

(22) Filed: Oct. 14, 2016

(65) Prior Publication Data

US 2017/0111506 A1    Apr. 20, 2017

Related U.S. Application Data

(60) Provisional application No. 62/241,478, filed on Oct. 14, 2015, provisional application No. 62/371,103, filed on Aug. 4, 2016.

(51) Int. Cl.
*H04M 3/527* (2006.01)
*H04M 15/00* (2006.01)
(Continued)

(52) U.S. Cl.
CPC .......... *H04M 3/527* (2013.01); *G06N 99/005* (2013.01); *H04M 15/41* (2013.01);
(Continued)

(58) Field of Classification Search
CPC ....... H04L 63/20; H04M 3/367; H04M 3/527; H04M 15/00; H04M 15/47; H04M 15/41; H04N 21/4725
(Continued)

(56) References Cited

U.S. PATENT DOCUMENTS 6,208,720 B1    3/2001    Curtis et al.
7,570,751 B2    8/2009    Betts et al.
(Continued)

OTHER PUBLICATIONS

International Search Report and Written Opinion for corresponding application PCT/US2016/057154 dated Jan. 23, 2017.
(Continued)

*Primary Examiner* — Gerald Gauthier
(74) *Attorney, Agent, or Firm* — Birch, Stewart, Kolasch & Birch, LLP

(57) ABSTRACT

Systems and methods for call detail record (CDR) analysis to determine a risk score for a call and identify fraudulent activity and for fraud detection in Interactive Voice Response (IVR) systems. An example method may store information extracted from received calls. Queries of the stored information may be performed to select data using keys, wherein each key relates to one of the received calls, and wherein the queries are parallelized. The selected data may be transformed into feature vectors, wherein each feature vector relates to one of the received calls and includes a velocity feature and at least one of a behavior feature or a reputation feature. A risk score for the call may be generated during the call based on the feature vectors.

17 Claims, 19 Drawing Sheets

(51) Int. Cl.
*G06N 99/00* (2010.01)
*H04M 7/00* (2006.01)
*H04W 12/12* (2009.01)

(52) U.S. Cl.
CPC .... *H04M 7/0078* (2013.01); *H04M 2203/551* (2013.01); *H04M 2203/6027* (2013.01); *H04W 12/12* (2013.01)

(58) Field of Classification Search
USPC ... 379/88.01, 88.18, 114.14, 265.09, 266.08; 705/7.11, 7.31, 26.35, 44, 26.3; 707/738; 703/11; 715/736, 738
See application file for complete search history.

(56) References Cited

U.S. PATENT DOCUMENTS

| | | | |
|---|---|---|---|
| 7,774,363 | B2 | 8/2010 | Lim |
| 8,027,879 | B2* | 9/2011 | Ramer ............... G06F 17/30867 705/14.4 |
| 8,145,562 | B2 | 3/2012 | Wasserblat et al. |
| 8,180,873 | B2 | 5/2012 | Bhatt et al. |
| 8,238,532 | B1* | 8/2012 | Cox ...................... H04M 15/06 379/114.14 |
| 8,364,147 | B2 | 1/2013 | Corem et al. |
| 8,509,733 | B2 | 8/2013 | Corem et al. |
| 8,583,498 | B2 | 11/2013 | Fried et al. |
| 8,666,841 | B1* | 3/2014 | Claridge ............... G06Q 30/00 705/26.1 |
| 8,767,948 | B1* | 7/2014 | Riahi ................... G06N 99/005 379/265.02 |
| 8,898,293 | B2 | 11/2014 | Raleigh et al. |
| 9,001,985 | B2 | 4/2015 | Cox et al. |
| 9,071,683 | B1 | 6/2015 | Somes et al. |
| 9,098,852 | B1 | 8/2015 | Dangott et al. |
| 9,100,451 | B2 | 8/2015 | Enqvist |
| 9,135,630 | B2 | 9/2015 | Goldfarb et al. |
| 9,154,640 | B2 | 10/2015 | Goldfarb |
| 9,203,856 | B2 | 12/2015 | Boggs et al. |
| 9,275,211 | B2 | 3/2016 | Stubblefield |
| 9,485,354 | B1* | 11/2016 | Flaks .................... H04M 3/367 |
| 2010/0199189 | A1* | 8/2010 | Ben-Aroya ....... G06F 17/30516 715/736 |
| 2014/0046850 | A1* | 2/2014 | Xiang ................. G06Q 20/322 705/44 |
| 2014/0079195 | A1* | 3/2014 | Srivastava ............. G06F 17/21 379/88.01 |
| 2014/0100835 | A1* | 4/2014 | Majumdar .......... G06Q 10/047 703/11 |
| 2014/0129420 | A1 | 5/2014 | Howe |
| 2014/0249873 | A1* | 9/2014 | Stephan ............... G06Q 10/063 705/7.11 |
| 2014/0314225 | A1* | 10/2014 | Riahi ..................... G06Q 30/02 379/265.09 |
| 2015/0113024 | A1 | 4/2015 | Howe |
| 2015/0181415 | A1 | 6/2015 | Raleigh et al. |
| 2015/0220619 | A1* | 8/2015 | Gray ................. G06F 17/30598 707/738 |
| 2016/0044056 | A1 | 2/2016 | Boggs et al. |
| 2016/0078456 | A1* | 3/2016 | Chakraborty ...... G06Q 30/0202 705/7.31 |
| 2016/0337403 | A1* | 11/2016 | Stoops ................ H04L 63/0861 |
| 2017/0111506 | A1* | 4/2017 | Strong .................. H04M 3/527 |
| 2017/0111515 | A1* | 4/2017 | Bandyopadhyay ... H04M 15/41 |
| 2017/0149984 | A1* | 5/2017 | Flaks .................... H04M 15/47 |
| 2017/0235466 | A1* | 8/2017 | Tanwir ................ G06F 3/04847 715/738 |
| 2017/0251261 | A1* | 8/2017 | James ................ H04N 21/4725 |

OTHER PUBLICATIONS

"16.6. multiprocessing—Process-based "threading" interface," pp. 1-56, downloaded Nov. 17, 2016, https://docs.python.org/2/library/multiprocessing.html.

"Aggregation", Aggregation—MongoDB Manual 3.2, pp. 1-4, downloaded Nov. 17, 2016, https://docs.mongodb.com/manual/aggregation/.

"Dual-tone multi-frequency signaling", Wikipedia, pp. 1-5, Sep. 30, 2016, https://en.wikipedia.org/wiki/Dual-tone_multi-frequency_signaling.

"Write Concern" Write Concern—MongoDB Manual 3.2, pp. 1-3, downloaded Nov. 17, 2016, https://docs.mongodb.com/manual/reference/write-concern/.

Schulzrinne, H., et al., "RTP Payload for DTMF Digits, Telephony Tones and Telephony Signals", #2833, May 2000, pp. 1-28, https://www.ietf.org/rfc/rfc2833.txt.

Schulzrinne, H., et al., "RTP Payload for DTMF Digits, Telephony Tones and Telephony Signals", #4733, Dec. 2006, pp. 1-50, https://tools.ietf.org/html/rfc4733.

* cited by examiner

```
1   db.cdr.aggregate(
2       {"$project": {"ANI": 1, "ACCOUNT_ID":1}},
3       {"$group":
4           {"_id": "$"+"ANI",
5            "value_set":{"$addToSet":"$"+"ACCOUNT_ID"}
6           }
7       },
8       {"$unwind": "value_set"},
9       {"$group": {"_id": "$_id", "num_unique": {"$sum": 1}}},
10  );
```

Example Aggregation API Usage with PyMongo

FIG. 8

```
1   # ... code above performs feature selection and normalization
2   ret = db.cdr.save({'time': datetime.datetime.now(),
3              'X': bson.binary.Binary(
4                  cPickle.dumps(self.X, cPickle.HIGHEST_PROTOCOL)),
5              'y': bson.binary.Binary(
6                  cPickle.dumps(self.y, cPickle.HIGHEST_PROTOCOL))
7                  })
```

Example Code to Store Feature Vectors with PyMongo

FIG. 9

First Call

| Timestamp | Step | Status |
|---|---|---|
| 7:39am | Language Menu | SUCCESS |
| 7:39am | Account Entry | SUCCESS |
| 7:41am | PIN Entry | FAILURE |
| 7:41am | PIN Entry | FAILURE |
| 7:41am | PIN Entry | FAILURE |
| 7:42am | SSN Entry | FAILURE |
| 7:43am | SSN Entry | FAILURE |

Second Call

| Timestamp | Step | Status |
|---|---|---|
| 7:54am | Language Menu | SUCCESS |
| 7:54am | Account Entry | SUCCESS |
| 7:55am | SSN Entry | SUCCESS |
| 7:55am | Balance Check | SUCCESS |
| 7:56am | PIN Change | SUCCESS |

| | | |
|---|---|---|
| ACEStart | ACEStart | SUCCESS |
| Language Menu | ENGLISH | SUCCESS |
| Authenticate PAN – Begin | | SUCCESS |
| PAN Entry | ************3283 | SUCCESS |
| PIN Entry | Error | NOMATCH |
| PIN Entry | **** | SUCCESS |
| PIN Retry Menu | Error | NOMATCH |
| PIN Retry Menu | PinRetry | SUCCESS |
| PIN Entry | **** | SUCCESS |
| PIN Retry Menu | PinRetry | SUCCESS |
| PIN Entry | **** | SUCCESS |
| PIN Entry | PIN Entry PIN Locked | FAILURE |
| Change PIN – Begin | | SUCCESS |
| PIN Locked Menu | Pinoneg | SUCCESS |
| SSN9 Entry | ********** | SUCCESS |
| Participant ID Entry | Timeout | NOINPUT |
| Participant ID Entry | Timeout | NOINPUT |
| Participant ID Entry | Participant ID Entry-Max | FAILURE |
| ACEStart | ACEStart | SUCCESS |
| Language Menu | ENGLISH | SUCCESS |
| Authenticate PAN – Begin | | SUCCESS |
| PAN Entry | ************3283 | SUCCESS |
| PIN Entry | **** | SUCCESS |
| PIN Entry | PIN Entry PIN Locked | FAILURE |
| PIN Locked Menu | Error | NOMATCH |
| Change PIN – Begin | | SUCCESS |
| PIN Locked Menu | Pinoneg | SUCCESS |
| SSN9 Entry | ********** | SUCCESS |
| Participant ID Entry | Timeout | NOINPUT |
| Participant ID Entry | Timeout | NOINPUT |
| Participant ID Entry | Timeout | NOINPUT |
| Participant ID Entry | Timeout | NOINPUT |
| Participant ID Entry | Participant ID Entry-Max | FAILURE |
| ACEStart | ACEStart | SUCCESS |

| | | |
|---|---|---|
| Language Menu | Timeout | NOINPUT |
| Language Menu | ENGLISH | NOINPUT |
| Authenticate PAN – Begin | | SUCCESS |
| PAN Entry | Timeout | NOINPUT |
| PAN Entry | Timeout | NOINPUT |
| PAN Retry Menu | Error | NOMATCH |
| PAN Retry Menu | Timeout | NOINPUT |
| PAN Retry Menu | AltAuth | NOMATCH |
| Authenticate ALTAUTH – Begin | | FAILURE |
| PAN Retry Menu | AltAuth | SUCCESS |
| SSN9 Entry | ********** | SUCCESS |
| Participant ID Entry | Timeout | SUCCESS |
| Participant ID Entry | Participant ID Entry-Max | NOINPUT |
| ACEStart | ACEStart | FAILURE |
| Language Menu | Timeout | SUCCESS |
| Language Menu | ENGLISH | NOINPUT |
| Authenticate PAN – Begin | | NOINPUT |
| PAN Entry | Timeout | SUCCESS |
| PAN Entry | Timeout | NOINPUT |
| PAN Retry Menu | ReportLost | NOINPUT |
| Replace Card – Begin | | FAILURE |
| PAN Retry Menu | ReportLost | SUCCESS |
| SSN9 Entry | ********** | SUCCESS |
| Participant ID Entry | Error | SUCCESS |
| Participant ID Entry | Timeout | NOMATCH |
| Participant ID Entry | Timeout | NOINPUT |
| Participant ID Entry | Timeout | NOINPUT |
| Participant ID Entry | Timeout | NOINPUT |
| Participant ID Entry | Participant ID Entry-Max | FAILURE |

| | |
|---|---|
| ACEStart | ACEStart |
| Language Menu | ENGLISH |
| Balance PAN – Begin | |
| PAN Entry | ************8888 |
| PAN Entry | Error |
| PAN Entry | Timeout |
| PAN Entry | Timeout |
| PAN Retry Menu | TryAgain |
| PAN Entry | ************8839 |
| PAN Entry | Timeout |
| PAN Entry | Timeout |
| PAN Retry Menu | TryAgain |
| PAN Entry | ************5994 |
| PAN Entry | Business Logic |
| ACEStart | ACEStart |
| Language Menu | ENGLISH |
| Balance PAN – Begin | |
| PAN Entry | ************8883 |
| PAN Entry | Timeout |
| PAN Entry | Timeout |
| PAN Retry Menu | Error |
| PAN Retry Menu | TryAgain |
| PAN Entry | ************8883 |
| PAN Entry | Timeout |
| PAN Entry | Timeout |

| | |
|---|---|
| PAN Retry Menu | Hangup |
| ACEStart | ACEStart |
| Language Menu | ENGLISH |
| Balance PAN – Begin | |
| PAN Entry | ************8839 |
| PAN Entry | Error |
| PAN Entry | ************8399 |
| PAN Entry | Timeout |
| PAN Entry | Timeout |
| PAN Retry Menu | Hangup |
| ACEStart | ACEStart |
| Language Menu | ENGLISH |
| Balance PAN – Begin | |
| PAN Entry | ************9491 |
| PIN Entry | **** |
| PIN Entry | Balance Playback |
| ACEStart | ACEStart |
| Language Menu | Error |
| ACEStart | ACEStart |
| Language Menu | ENGLISH |
| Balance PAN – Begin | |
| PAN Entry | ************5629 |
| PIN Entry | **** |
| PIN Entry | Balance Playback |

FIG. 14

FRAUD DETECTION IN INTERACTIVE VOICE RESPONSE SYSTEMS

The present application claims priority to U.S. Provisional Patent Application Ser. No. 62/241,478, filed Oct. 14, 2015, and U.S. Provisional Patent Application Ser. No. 62/371,103, filed Aug. 4, 2016, the entire disclosures of which are hereby incorporated by reference.

BACKGROUND

Telephone-based systems collect useful metadata, including Call Detail Records (CDR). By analyzing large volumes of CDR data from a phone system, behavioral patterns can be discerned that can identify fraudulent activity.

It is desirable to identify fraudulent activity during a call or determine a risk score for a call during the call. Waiting until after the call is completed may mean a fraud is already perpetrated or an opportunity to acquire information regarding the perpetrator has been lost. Detecting fraud during a call allows the caller to act accordingly. For example, in addition to disallowing access to an account, the caller may request additional information about the caller to supplement a profile concerning the caller.

Deployment of a system to identify fraudulent activity during a call or to determine a risk score for a call during the call may result in the rapid acquisition of many records. For example, a bank may have millions of customers or users. Performing look-up, detecting fraud, and taking action in response to the fraud detection (or determining low probability of fraud and taking action in response to the low probability of fraud) during a call becomes increasingly difficult as the number of records increases, both in terms of the number of users and the number of records per user. Some features relevant to determining a risk score may be difficult to determine rapidly.

As recognized by the inventors, data contained in CDRs and data obtained during a call may be used to determine fraud. Using the systems and methods disclosed herein, fraudulent activity may be detected and identified, and a risk score determined, during a call, including in situations involving large amounts of data. Further, the risk score for a call may be determined during the call using features which may be complex, including behavior, reputation, and velocity features. A machine learning model, which may include a supervised classifier, may be used in the determination of the risk score of a call during the call.

Interactive voice response (IVR) systems are widely used as a means for appropriately routing a call into a call center. As the use of these systems has become more widespread, users of the IVR have been able to accomplish an ever-increasing number of tasks from within the system, often without interacting with a human. These tasks include account authentication, balance checking, and more. With this increase in capability in the IVR has come an increase of malicious activity directed towards extracting information and committing fraud by taking advantage of weaknesses inherent in an automated system.

As recognized by the inventors, user behavior in an IVR system may enable the detection of fraudulent or malicious interactions when compared to the behavior of genuine users. By monitoring how users interact with a system historically, a detection framework may be constructed to predict and prevent fraudulent or malicious activity.

SUMMARY

This specification describes technologies relating to CDR analysis to identify fraudulent activity and fraud detection in IVR systems.

In general, one aspect of the subject matter described in this specification can be embodied in a computer-implemented method or an apparatus.

According to an embodiment, the invention may include a computer-implemented method for determining a risk score of a call received by an Interactive Voice Response (IVR) system, the computer-implemented method comprising: creating a feature vector based on interaction with the IVR system during the call; and using a machine learning model to determine the risk score of the call based on the created feature vector.

According to other aspects of the invention, the computer-implemented method may further comprise: representing prior calls as feature vectors; labeling the feature vectors representing the prior calls; and training the machine learning model using the labeled feature vectors.

According to other aspects of the invention, information regarding the call is stored in a database before the using a machine learning model to determine the risk score of the call based on the created feature vector.

According to other aspects of the invention, information regarding the call is retrieved from the database before the using a machine learning model to determine the risk score of the call based on the created feature vector.

According to other aspects of the invention, the created feature vector is based on a behavior feature of the call, and wherein the behavior feature of the call is a sequence of actions taken during interaction with an IVR system.

According to other aspects of the invention, the created feature vector is based on a behavior feature of the call; and the behavior feature of the call is at least one of an action taken during interaction with an IVR system, an amount of time elapsed between actions taken during interaction with an IVR system, providing incorrect information to an IVR system, a number of times a specific activity in an IVR was performed, a number of times an IVR was called during a measure of time, a volume or a duration of at least one DTMF tone during interaction with an IVR system, an amount of time elapsed between DTMF tones, a use of voice during interaction with an IVR system, an amount of time elapsed between a beginning of an IVR prompt and a user's spoken response to the IVR prompt, or an amount of time elapsed between an IVR prompt and an action taken during interaction with an IVR system.

According to other aspects of the invention, information regarding the prior calls is stored in a non-relational database.

According to other aspects of the invention, the prior calls are all from a same phone number.

According to other aspects of the invention, the prior calls are from a plurality of phone numbers, and each of the labeled feature vectors used to train the machine learning model has a same label as each of the other labeled feature vectors used to train the machine learning model.

According to other aspects of the invention, the labeling the feature vectors representing the prior calls is done using a first label representing genuineness and a second label representing non-genuineness.

According to other aspects of the invention, the representing prior calls as feature vectors includes representing interaction with an IVR system using action words.

According to other aspects of the invention, the representing prior calls as feature vectors includes: representing interaction with an IVR system using action words in a document; and converting the document to a feature vector.

According to other aspects of the invention, the representing prior calls as feature vectors includes representing interaction with an IVR system using at least one of N-grams or skip N-grams.

According to other aspects of the invention, the representing prior calls as feature vectors includes determining an inverse document frequency.

According to other aspects of the invention, the computer-implemented method may further comprise taking an action based on the risk score of the call.

According to other aspects of the invention, the taking an action based on the risk score of the call includes at least one of displaying the risk score on a display during the call, storing the risk score in a database during the call, altering an IVR call flow during the call, notifying police, or notifying an owner of an IVR system.

According to other aspects of the invention, the taking an action based on the risk score of the call includes at least one of altering an IVR call flow during the call, disabling a feature in the IVR system during the call, locking down the IVR system, requiring alternative identification during the call, or requesting additional information during the call.

According to other aspects of the invention, the interaction with the IVR system includes responses to the IVR system represented using action words.

In another embodiment of the invention, the invention may include a computer-implemented method for determining a risk score for a call, the computer-implemented method comprising: storing information extracted from received calls; performing queries of the stored information to select data using keys, wherein each key relates to one of the received calls, and wherein the queries are parallelized; transforming the selected data into feature vectors, wherein each feature vector relates to one of the received calls and includes a velocity feature and a behavior feature; and generating, during the call, the risk score for the call based on the feature vectors.

According to other aspects of the invention, each feature vector includes a reputation feature.

According to other aspects of the invention, the computer-implemented method may further comprise: training a machine learning model using the feature vectors; using the machine learning model to generate the risk score for the call; and displaying the risk score for the call on a display during the call, wherein the queries are parallelized using a thread pool.

In another embodiment of the invention, an apparatus that determines a risk score of a call received by an Interactive Voice Response (IVR) system may comprise at least one processor; and a non-transitory computer-readable medium coupled to the at least one processor having instructions stored thereon that, when executed by the at least one processor, causes the at least one processor to: create a feature vector based on interaction with the IVR system during the call; and use a machine learning model to determine the risk score of the call based on the created feature vector.

According to other aspects of the invention, the created feature vector is based on a behavior feature of the call, and the behavior feature of the call is a sequence of actions taken during interaction with an IVR system.

In another embodiment of the invention, an apparatus that determines a risk score for a call may comprise at least one processor; and a non-transitory computer readable medium coupled to the at least one processor having instructions stored thereon that, when executed by the at least one processor, causes the at least one processor to: store information extracted from received calls; perform queries of the stored information to select data using keys, wherein each key relates to one of the received calls, and wherein the queries are parallelized; transform the selected data into feature vectors, wherein each feature vector relates to one of the received calls and includes a velocity feature and a behavior feature; and generate, during the call, the risk score for the call based on the feature vectors.

In another embodiment of the invention, the invention may include a computer-implemented method for determining a risk score for a call, the computer-implemented method comprising: receiving a call from a particular phone number; retrieving pre-stored information relating to the particular phone number to derive a reputation feature and a velocity feature; including the reputation feature and the velocity feature in a feature vector; and generating a risk score for the call based on the feature vector.

According to other aspects of the invention, the computer-implemented method may further comprise: labeling the feature vector; training a machine learning model using the labeled feature vector and other labeled feature vectors; and using the machine learning model to generate the risk score for the call.

According to other aspects of the invention, the computer-implemented method may further comprise: taking an action based on the risk score for the call, wherein the taking an action based on the risk score for the call includes at least one of displaying the risk score on a display during the call, storing the risk score in a database during the call, altering an interactive voice response (IVR) call flow during the call, notifying police, notifying an owner of an IVR system, disabling a feature in an IVR system during the call, locking down an IVR system during the call, requiring alternative identification during the call, or requesting additional information during the call.

According to other aspects of the invention, the feature vector includes a behavior feature derived from the call.

According to other aspects of the invention, the pre-stored information is stored in a database and retrieved from the database before the including the reputation feature and the velocity feature in the feature vector.

According to other aspects of the invention, the velocity feature is a sequence of calls or attempted calls from at least one originating phone number similar to the particular phone number.

According to other aspects of the invention, the velocity feature is at least one of a number of distinct account identifiers, a number of distinct originating phone numbers associated with an account identifier, or a number of destinations called.

According to other aspects of the invention, the feature vector includes a velocity feature based on at least one of a number of calls, a duration of at least one prior call, a duration between calls, or a periodicity between calls.

According to other aspects of the invention, the reputation feature is at least one of suspicious activity, malicious activity, a prior complaint, a device type, a carrier, a route taken by the call prior to entering a telephone exchange, a route taken by the call after leaving a telephone exchange, or a location.

According to other aspects of the invention, the pre-stored information is stored in a non-relational database.

According to other aspects of the invention, the pre-stored information is stored in a graph database.

According to other aspects of the invention, the risk score is generated during the call.

According to other aspects of the invention, the retrieving pre-stored information relating to the particular phone number to derive a reputation feature and a velocity feature is done using at least one query to select the pre-stored information.

In another embodiment of the invention, the invention may include a computer-implemented method for determining a risk score for a call, the computer-implemented method comprising: storing information extracted from received calls; performing queries of the stored information to select data using keys, wherein each key relates to one of the received calls, and wherein the queries are parallelized; transforming the selected data into feature vectors, wherein each feature vector relates to one of the received calls and includes a velocity feature and a reputation feature; and generating, during the call, the risk score for the call based on the feature vectors.

According to other aspects of the invention, each feature vector includes a behavior feature.

According to other aspects of the invention, the computer-implemented method may further comprise: training a machine learning model using the feature vectors; using the machine learning model to generate the risk score for the call; and displaying the risk score for the call on a display during the call, wherein the queries are parallelized using a thread pool.

In another embodiment of the invention, an apparatus that determines a risk score for a call may comprise the following: at least one processor; a non-transitory computer readable medium coupled to the at least one processor having instructions stored thereon that, when executed by the at least one processor, causes the at least one processor to: receive a call from a particular phone number; retrieve pre-stored information relating to the particular phone number to derive a reputation feature and a velocity feature; include the reputation feature and the velocity feature in a feature vector; and generate a risk score for the call based on the feature vector.

According to other aspects of the invention, the velocity feature is a sequence of calls or attempted calls from at least one originating phone number similar to the particular phone number.

According to other aspects of the invention, the apparatus may further comprise a display that displays, during the call, the risk score for the call.

In another embodiment of the invention, an apparatus that determines a risk score for a call may comprise: at least one processor; a non-transitory computer readable medium coupled to the at least one processor having instructions stored thereon that, when executed by the at least one processor, causes the at least one processor to: store information extracted from received calls; perform queries of the stored information to select data using keys, wherein each key relates to one of the received calls, and wherein the queries are parallelized; transform the selected data into feature vectors, wherein each feature vector relates to one of the received calls and includes a velocity feature and a reputation feature; and generate, during the call, the risk score for the call based on the feature vectors.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 8 is example code using the Aggregation application programming interface (API) with PyMongo according to one or more embodiments of the present invention.

FIG. 9 is example code to store feature vectors of calls to a database using PyMongo according to one or more embodiments of the present invention.

FIG. 12 is a table showing call flows for a first call and a second call, both calls from the same phone number, wherein the two calls are a phishing attempt.

FIG. 13 shows an example of IVR reconnaissance performed by a fraud detection system.

FIG. 14 shows an example of IVR reconnaissance performed by a fraud detection system.

DETAILED DESCRIPTION

CDR analysis for detecting fraudulent activity and fraud detection in the IVR may involve the following: designing features from CDR data or a user's interaction with the IVR to represent each call as a feature vector, using a labeled set of feature vectors to train a machine learning model, and using the trained model for scoring the riskiness of each call. In at least one embodiment, a user's interaction with the IVR during a single call may be represented in an IVR call flow or a call detail record. A CDR may include data regarding the call in addition to data relating to the user's interaction with the IVR.

Characteristics of CDR Data

A typical CDR data set has at least one record for each phone call. The exact schema of the CDR records vary widely depending on the domain, however, most of them contain at least the following: start timestamp and, if the call has ended, end timestamp, the originating telephone number (originating phone number) of the call from a source or originating automatic number identification (ANI) of the call, the destination ANI of the call if applicable, the route taken by the call entering an exchange, the route taken by the call leaving an exchange, whether the call successfully connected, and the call type (voice, SMS, MMS, etc.).

Application-specific CDR information may include account numbers or other information pertaining to a called party running an application. For example, a bank might have an application that tracks which account(s) a caller tried to access in the call. Application-specific CDR information may also include IVR information. For example, a sophisticated CDR system can create additional records per call, tracking the individual steps that a caller traverses in the IVR. Further, application-specific CDR data may include the amount of time elapsed between steps (whether IVR prompt or caller response) in an IVR call flow, including the time between key presses or DTMF tones. Application-specific CDR information may also include location information. For example, mobile networks may track base station and cell tower information for a call and include the information in the CDR for the call.

All of this data represents a rich source of information for inferring patterns in user behavior. Finding these patterns, however, requires representing the data in creative ways so that features of interest may be visualized and extracted. For example, graphs may be used to represent this data.

Representing CDR Data Using Graphs

A graph is essentially a network with nodes connected by edges. Edges can be directed or undirected. Both nodes and edges can be annotated with information. While they are simple to define, graphs are a powerful way to represent heterogeneous pieces of information which are related to each other, and to understand complex interactions between them.

Figure 16:
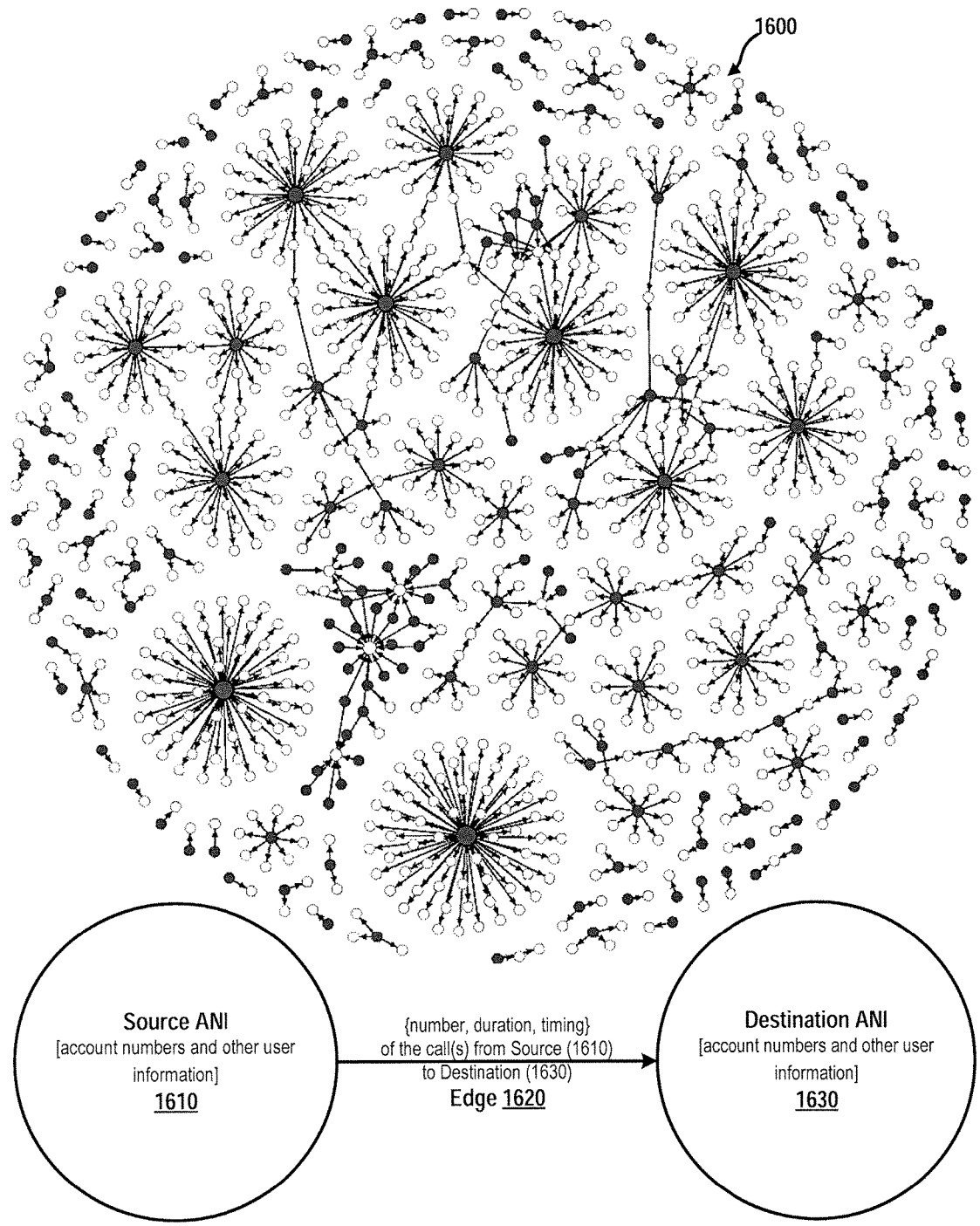
FIG. 16 is a drawing illustrating a graph of calls and components of a graph which may be used in one or more embodiments of the present invention.

FIG. 16 is a drawing illustrating a graph of calls and components of a graph which may be used in one or more embodiments of the present invention. For example, CDR data may be represented in a graph (1600) with source (1610) and destination (1630) ANIs as nodes. The edges (1620) in the graph may be directed, representing a call made from the source to the target. The edges (1620) can be annotated with information about the number, duration, and timings of the calls. The nodes (1610) and (1630) can be annotated with account numbers and other user information.

A graph can show interesting properties like node degree, clustering, and connectivity. The graph may represent activity over a finite length of time. With respect to node degree, it may be observed that most source ANIs call 1-3 destination ANIs. However, a small number of ANIs call a large number of destinations, e.g. spammer telemarketers. In a graph where each node represents either a source ANI or a destination ANI, ANIs calling a large number of destinations would be represented by nodes having high degree. These exceptions might represent some form of fraud including "ANI scanning", which may be relevant in determining premium rate fraud as discussed below.

With respect to clustering and connectivity, it may be observed that the graph is clearly split into many small and a few large connected components. The question arises as to whether some connected components of unusual size may represent fraud. Traffic pumping may involve using as much time as possible during a call to a toll-free number and/or making an unusually high number of calls to a toll-free number. A bad actor's purpose in traffic pumping may be to increase the fees for the caller's local exchange carrier, which may be entitled to intercarrier transfer fees from the called party's telecommunications provider. Traffic pumping may be performed by a large number of ANIs in order to evade detection. Thus, a toll-free number receiving calls from an unusual number of ANIs represented by a destination node (1630) having unusually high fan-in (number of in-edges) might indicate traffic pumping.

These observations about graphs may be represented as numeric values that can be used as features in further statistical and machine learning analysis.

IVR Systems

Typically an IVR system will utilize dual-tone multi-frequency (DTMF) signaling to transmit the user's selections and information through the network. DTMF signaling is a signaling system used by telephony infrastructure to communicate information. When a user dials digits on the keypad of a phone or other telephony device, the "touch tones" are DTMF.

As traditional public switched telephone network (PSTN) traffic is converted to voice over IP (VoIP), the actual audio tones generated by the device, are often converted to an encoding format specified in RFC 4733. This conversion removes almost all of the audible tone from the call, and replaces it with a digital representation of the digit that was pressed, the duration of the tone, and a few other pieces of information.

Often, telephony equipment that participates in the connection and handling of a call will interpret the RFC 4733 encodings of the key presses and respond accordingly. This is what the IVR uses to gather information from the user after prompting the user to enter information like account number, date of birth, social security number, etc. When a user enters this sort of information, and it is converted to RFC 4733, the IVR system simply needs to read the digit pressed out of the call stream as opposed to "listening" for tones and determining the corresponding numbers.

An IVR system may utilize the user's voice to transmit the user's selections and information to the IVR system using conventional speech recognition.

Feature Design for CDR Analysis

Features, in machine learning terminology, are metrics which, statistically speaking, are likely to distinguish instances. For example, "good" (e.g. not fraudulent or likely not fraudulent) instances may be distinguished from "bad" (e.g. fraudulent or likely fraudulent) instances. In the case of CDRs, reputation, velocity, and behavior features may be extracted.

Reputation Features

When a phone call is received, it may be useful to know what is known about the reputation of the calling phone number and whether it has already been associated with suspicious or malicious activity. Several pieces of relevant information may be tracked to form reputation features including, without limitation, the following: carrier, device type (e.g. landline, cell, VoIP, softphone, or specific phone model), and complaints associated with the ANI/calling party's phone number, both in public and private databases. Using these and other data a risk score can be calculated for each phone number.

Velocity Features

Velocity features summarize the trends associated with an ANI over time. Many velocity features emerge naturally from representing the CDR data as a graph. In addition to representing ANIs as nodes and calls as undirected edges or directed edges from source to destination ANI, other information such as accounts, names, and locations may also be incorporated into the graph. Some typical and useful velocity features include the following: the number of destination ANIs that a source ANI has called, the number of user accounts associated with an ANI and vice versa, the average frequency of calls from or to an ANI, and the average interval between subsequent calls from or to an ANI. These features are particularly useful when it is suspected that specific actions are associated with malicious activity. Many of these features are essentially graph properties: node degree, edge creation frequency, size of connected components, and so on.

Behavior Features

Behavior features indicate the genuineness or suspiciousness of a caller's actions, especially with respect to a caller's interaction with an IVR system. In a modern IVR system, information can be gathered about user behavior to distinguish their navigation or information entry as genuine or malicious. In order to make these insights, multiple aspects of the IVR system are used, including but not limited to DTMF signaling information like volume and duration of a DTMF tone and the amount of time elapsed between DTMF tones, voice navigation, caller metadata, and the entries made by the user (noted as behavior features). Using these and other data, a risk score can be calculated for each phone number.

Each user of an IVR system has a unique way of navigating within the options and accomplishing their desired outcome. It has been recognized and verified that based on behavior features, genuine individual users and genuine users as a group have "fingerprints", including patterns of use and activity, different than those of malicious users. Malicious activity includes, but is not limited to, brute force attempts, information mining (reconnaissance), robotic dialing, spoofing, hiding behind gateways, and account takeover.

By tracking statistical information for behavior features, a framework for fraud detection can be constructed to predict and prevent malicious activity, including malicious activity in the IVR. In addition, a feedback loop confirming fraud or malicious activity enhances the system's ability to detect and deter future attempts. The feedback loop may comprise retraining a machine learning model using newly labeled data and/or data with revised labels.

The IVR call flow sequence may be broken up into chunks, and each chunk may then be converted into a numeric feature vector. The chunks may be of different sizes. These feature vectors may have a very high number of dimensions. In at least one embodiment, features that are especially predictive of the label of interest, e.g., "fraud" or "not_fraud" or "human" or "robot", may be selected using a feature selection technique such as the chi-squared method.

Using Text Analysis to Represent IVR Call Flow as Features

Figure 1:
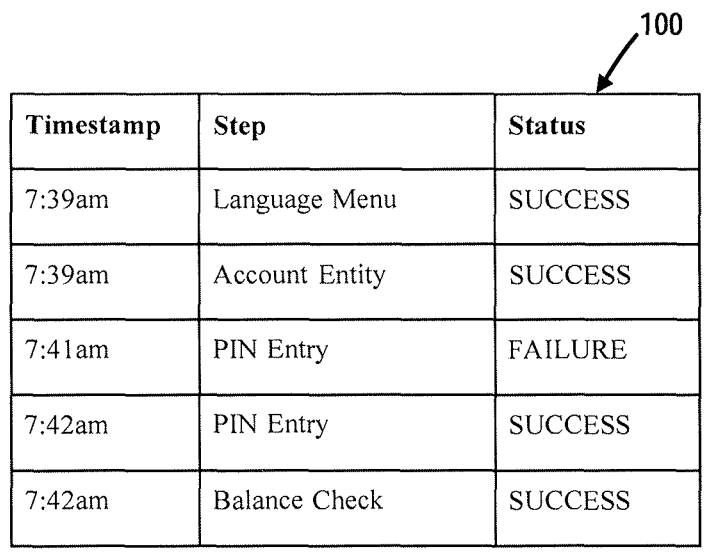
FIG. 1 is a table showing an IVR call flow for a normal (benign or genuine) user.

A typical IVR call flow may be represented in CDR data as a sequence of records, each of which has a timestamp, along with the name of the step and information about its outcome. FIG. 1 is a table 100 showing an IVR call flow for a normal (benign or genuine) user. FIG. 1 depicts a single failed PIN attempt, most likely a mistake, followed by a successful PIN entry and a balance check.

Figure 2:
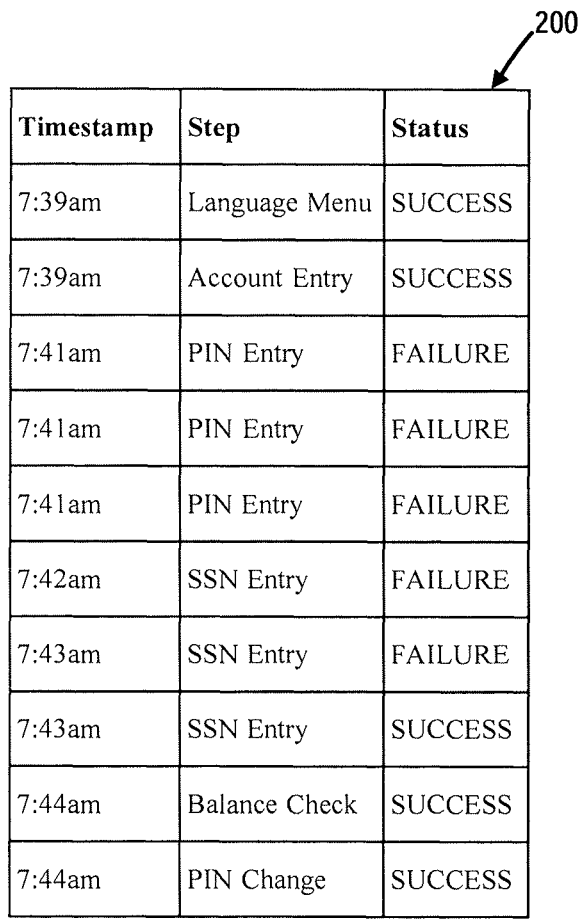
FIG. 2 is a table showing a phishing attempt in an IVR call flow.

On the other hand, FIG. 2 is a table 200 showing a possible phishing attempt. The user tries several times to enter a PIN, fails, and then tries another authentication method and succeeds in accessing the account. After checking the account balance, the user attempts to take over the account by changing the PIN.

Tables 100 and 200 are just two example representations of an IVR call flow and are not intended to limit the forms of representation of IVR call flow or indicia of fraud. Information from IVR call flow which may be recorded or encoded as features may also include entries made by a user (whether using a keypad, DTMF tones, teletype, teletypewriter, TTY device, the user's voice, or any other input device used by the user to provide information to the IVR system) or the time the entry was made, perhaps with granularity more specific than just hours and minutes (e.g. seconds or milliseconds).

Represent One or More Call Flow Sequence(s) as a Document

A call flow sequence may be represented as text, including words in a natural language like English or a concatenation thereof. As used herein, "text document" refers to the text representation of the call flow sequence which may be contained within a number of file formats, including a text document, a file containing English words or the concatenation thereof in an ASCII encoding, a data file, a file containing data legible to a database management system, or a file containing information that may be queried using a relational database, a non-relational database, or a graph database.

In order to represent a call flow sequence as text, in at least one embodiment of the present invention, each IVR step is transformed to a description comprising one or more "action words", and then a document representing the IVR call flow is created. For example, the IVR call flow sequences in FIGS. 1 and 2 could be represented using action words as follows: [LanguageMenu AccountEntry PinEntry PinEntry BalanceCheck] and [LanguageMenu AccountEntry PinEntry PinEntry PinEntry SSNEntry SSNEntry SSNEntry BalanceCheck PINChange], respectively.

Different representations of each step in the IVR call flow are possible. For example, in FIG. 1, the first row having timestamp of 7:39 am could be represented, without limitation, using one or more of the following action words: "LanguageMenu", "7:39 am", "Success", "LanguageMenuSuccess", "English", "LanguageMenuEnglish", or "EnglishSuccess", where English may have been a language selected by the user. Action words may specify values entered by the user. Many combinations of data may be represented using action words. More generally, each IVR step may be represented using a description containing information that has predictive value or leads to better prediction.

One or more action words are used to provide a description of each IVR call flow step, and the description contains information that may be useful in determining a risk score. By including a timestamp for a step in an IVR call flow, or an amount of time elapsed between steps in an IVR call flow, action words may be used in determining an amount of time elapsed between actions taken during interaction with an IVR system. By including a timestamp both for an IVR prompt and a user's response to the IVR prompt, action words may be used in determining an amount of time elapsed between an IVR prompt and an action taken during interaction with an IVR system. Queries may be performed to select data based on timestamp with a key such as caller phone number.

Call flow sequences from multiple calls, perhaps from the same source, may be combined to create a single document. The multiple calls may be contiguous calls. For example, FIG. 2 may represent one call made at 7:39 am and lasting through 7:44 am. However, FIG. 12 may represent two calls from the same originating ANI, the first call made at 7:39 am and the second call made at 7:54 am. Instead of representing the two calls depicted in FIG. 12 using two text documents, the two calls may be represented as a single text document as follows: [LanguageMenu AccountEntry PinEntry PinEntry PinEntry SSNEntry SSNEntry LanguageMenu AccountEntry SSNEntry BalanceCheck PINChange]. Again, various forms of action words are possible. Each action word may have an associated timestamp. Generally, a number c>1 of calls may be represented as a single text document by appending representations of the call flows as described herein. The c calls may be from the same ANI. The c calls may be from the same entity calling from more than one ANI. The c calls may be from more than one ANI. The c calls may be from more than one entity. The c calls may be selected according to a time window in which the c calls were made. The c calls may be selected according to an amount of time elapsing between calls.

By using action words to represent a user's identity or ANI, a number of times an IVR was called by a particular user or particular ANI may be represented. Further, by using action words comprising a timestamp indicating the time a call was received, a number of times an IVR was called during a measure of time may be represented. Thus, by combining action words representing a user's identity or an ANI with action words comprising a timestamp indicating the time a call was received, a number of times an IVR was called by a particular user or a particular ANI during a measure of time may be represented. Queries may be performed to select timestamp data with a key such as caller phone number.

Create Feature Vectors from Documents

Once call flow sequences are represented as documents, documents may be converted to feature vectors. For this, in at least one embodiment of the present invention, a standard vector space model commonly used in text analysis may be used. In at least one embodiment of the present invention, the vector space model may work by processing the documents through the following steps. First, break all the documents into terms, where each term may be an N-gram (a contiguous chunk of words up to length N) or a skip N-gram (a non-contiguous chunk of words, typically omitting words of little predictive value). Second, calculate the frequency of each term (TF) and the inverse document frequency of each term (IDF). Third, create a "term-document" matrix populated with TF-IDF values, wherein the matrix comprises m rows and n columns. Each of the n columns of the term-document matrix corresponds to a document, wherein each document contains call flow sequences from one or more calls. Thus, each column of the term-document matrix is an m-dimensional feature vector corresponding to a document. Each row of the term-document matrix corresponds to a feature. Optionally, in order to reduce dimensionality, select the k features (k<m) most predictive of a label of interest using a feature selection criterion, e.g. chi-squared. Finally, use the k-dimensional feature vectors (or the m-dimensional feature vectors) to train a classifier to label calls using the label of interest.

Denote the frequency of term i in document j as $tf_{i,j}$ and the inverse document frequency of term i as $idf_i$. Let n equal the total number of documents in the collection and $d_i$ equal the number of documents in the collection that contain term i. Then, in at least one embodiment, define $$idf_i = \log\left(\frac{n}{d_i}\right)$$

and $tf\text{-}idf_{i,j} = tf_{i,j} \times idf_i$.

Figure 15:
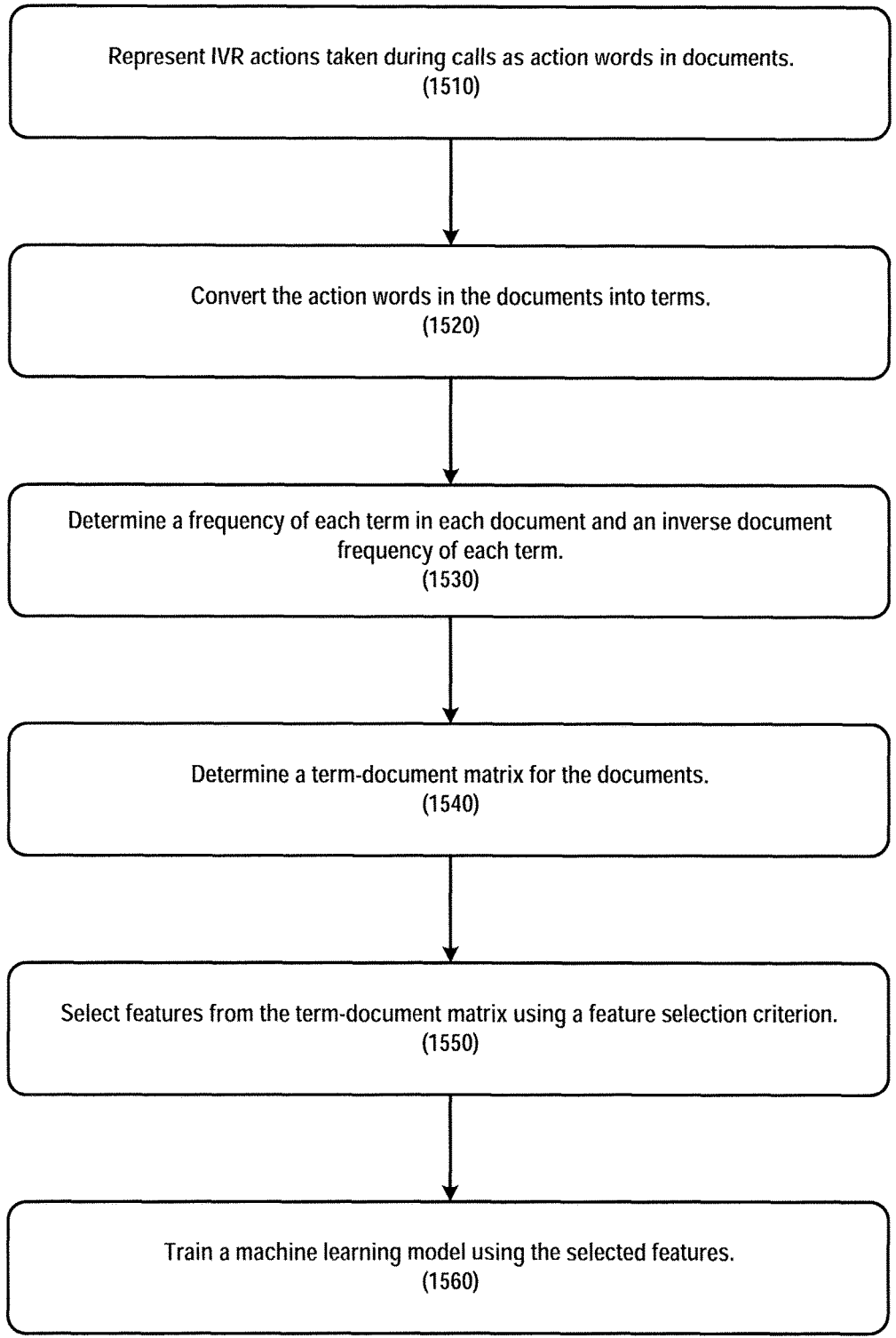
FIG. 15 describes a method for generating IVR call flow features and using the IVR call flow features to train a machine learning model which may be used to classify calls according to one or more embodiments of the present invention.

FIG. 15 describes a method for generating IVR call flow features and using the IVR call flow features to train a machine learning model which may be used to classify calls according to one or more embodiments of the present invention. First, IVR actions taken during calls are represented (1510) as action words in documents. Second, action words in the documents are converted (1520) to terms. Third, a frequency of each term in each document and an inverse document frequency of each term are determined (1530). Fourth, a term-document matrix is determined (1540) for the documents. Fifth, features from the term-document matrix are selected (1550) using a feature selection criterion. Sixth, a machine learning model is trained (1560) using the selected features.

Case Study: State Benefits Provider

A major state benefits provider had fraudsters filing fraudulent claims causing major losses. In particular, fraudsters were using the benefit provider's IVR system to find valid information, which they then used to take over accounts. In order to detect this kind of probing activity, features were extracted, and a machine learning model was trained on a labeled subset of data and used to determine risk scores for new calls.

IVR Reconnaissance Detection: Example 1

FIG. 13 shows an example of IVR reconnaissance performed by a fraud detection system. A fraudster made nine calls from the same ANI in a space of ten minutes. The call flow sequence sample shows several attempts at entering a valid PIN number, followed by a card replacement attempt. This is only a small sample of the call flow sequence, but the rest follows a similar pattern.

IVR Reconnaissance Detection: Example 2

FIG. 14 shows an example of IVR reconnaissance performed by a fraud detection system. In this second instance, a fraudster makes multiple calls from the same ANI in a space of one hour. The fraudster makes seven attempts at entering a valid PAN number, culminating in two successful PAN and PIN number entries.

This use case produced a large amount of data. The state benefits provider handles about 20 million calls per month, leading to hundreds of gigabytes of CDR data. Therefore, it may be necessary to scale feature extraction and machine learning to a high-volume data set.

Figure 3:
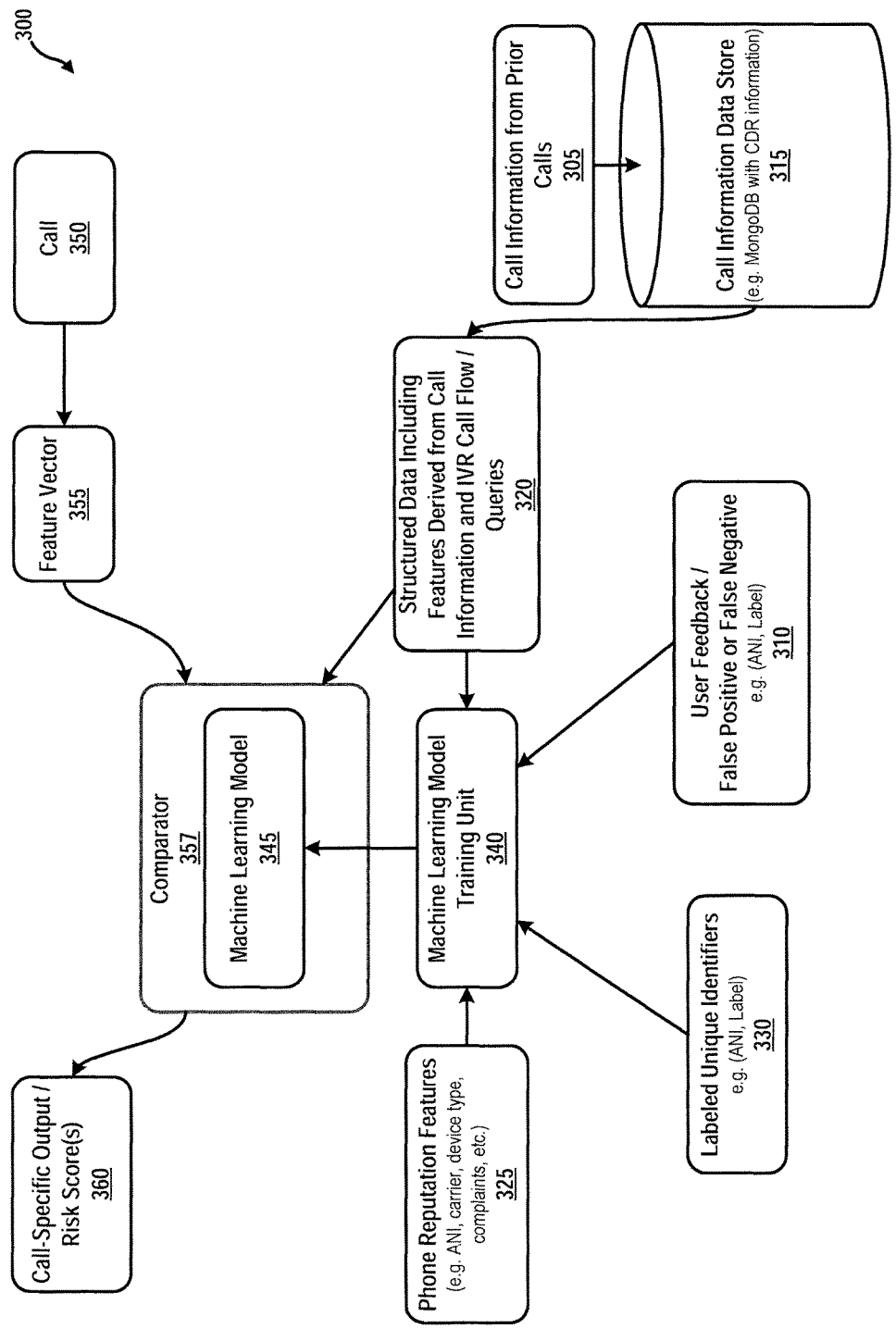
FIG. 3 is a block diagram illustrating a system for determining a risk score of a call according to one or more embodiments of the present invention.

FIG. 3 is a block diagram illustrating a system for determining a risk score of a call according to one or more embodiments of the present invention. FIG. 3 includes call information from prior calls 305, user feedback 310, call information data store 315, structured data including features derived from call information and IVR call flow/queries 320, phone reputation features 325, labeled unique identifiers 330, machine learning model training unit 340, machine learning model 345, call 350, feature vector 355, comparator 357, and call-specific output/risk score(s) 360.

Unique identifiers may be in the form of, without limitation, an ANI, originating telephone (phone) number, an account number or account identifier (account ID, PIN, PAN), a social security number (SSN), a username, a subscriber identity module (SIM) authentication key, an international mobile subscriber identity (IMSI), or an international mobile station equipment identity (IMEI).

Call information from prior calls 305 may be stored in the call information data store 315. The call information from prior calls 305 may include or be based on IVR call flows and/or CDRs. The call information from prior calls 305 may also include, without limitation, user feedback 310, labeled unique identifiers 330, and phone reputation features 325. The call information data store 315 may be implemented using a relational or non-relational or document-oriented database, and the database may be managed by a database management system (DBMS). The DBMS may be MongoDB. The DBMS may be MongoDB in a PyMongo environment. The database may be a graph database.

Labeled unique identifiers 330 may include a unique identifier, such as ANI, and a label, e.g. "fraud" or "not_fraud" or "human" or "robot", in the form of a (ANI, Label) pair. The user feedback 310 may identify instances that are false positives or false negatives and may be in the form of a (ANI, Label) pair. Phone reputation features 325 may include, without limitation, a unique identifier (such as ANI), the calling party's carrier, a device type (e.g. landline, cell, VoIP, softphone, or specific phone model), and complaints associated with the unique identifier. Queries 320 are made against the call information data store 315, and the queries return structured data including features derived from call information and/or IVR call flow 320.

Labeled unique identifiers 330, user feedback 310, phone reputation features 325, and/or the structured data including features returned from queries 320 (collectively, "training data") may be passed to the machine learning model training unit 340. The machine learning model training unit 340 learns a machine learning model 345 based on the training data.

A feature vector 355 may be extracted from call 350. The feature vector 355 may be extracted from the IVR call flow and/or the call's metadata, including a CDR for the call. The feature vector 355 may be passed to the comparator 357, which compares the feature vector 355 to the machine learning model 345 to produce output 360 specific to the call. The output 360 may include a risk score for the call. The risk score may be a label from a finite set of labels, e.g. {fraud, not_fraud} or {human, robot}. The risk score may be a numeric value indicating a confidence level regarding whether the call can be labeled with one of the labels from the finite set of labels, e.g. a scale comprising integers from 1 to 10, with 1 being least likely fraudulent and 10 being most likely fraudulent.

Some of the calls regarding which call information is stored in the data store 315 may have no label or risk score associated with them. As such, it may be desirable to determine a risk score for these unlabeled calls. Queries may be made against the call information data store to obtain structured data 320 for unlabeled calls. This structured data 320 for unlabeled calls may be passed to the comparator 357, which in turn produces output 360 which may include risk scores for the unlabeled calls.

Figure 4:
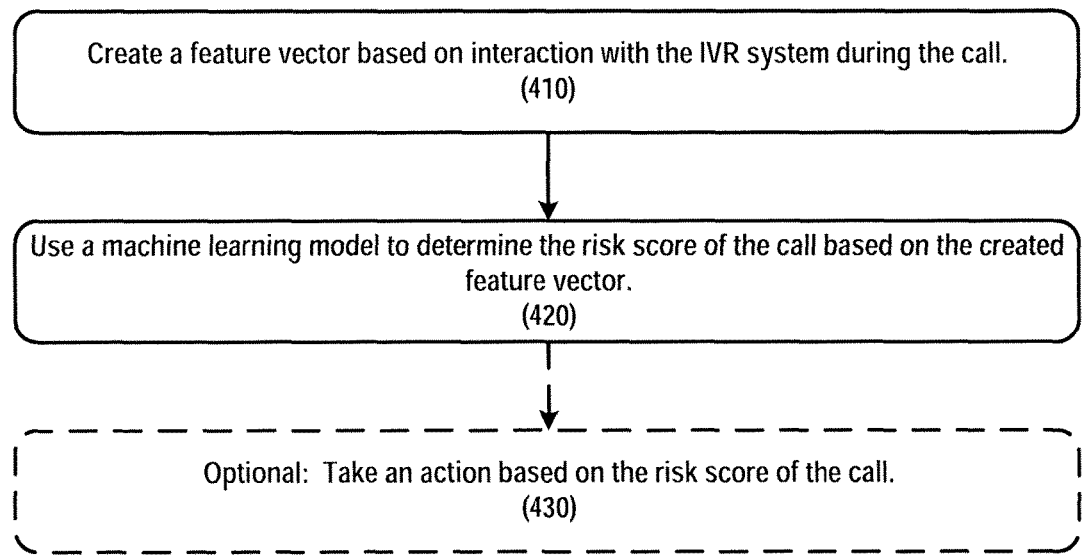
FIG. 4 is a block diagram illustrating a method for determining a risk score of a call received by an Interactive Voice Response (IVR) system according to one or more embodiments of the present invention.

FIG. 4 is a block diagram illustrating a method for determining a risk score of a call received by an Interactive Voice Response (IVR) system according to one or more embodiments of the present invention. First, a feature vector is created (410) based on interaction with the IVR system during the call. Second, a machine learning model is used (420) to determine the risk score of the call based on the created feature vector. Optionally, an action may be taken (430) based on the risk score of the call. The feature vector may be based on velocity feature(s) of the call, reputation feature(s) of the call, or behavior feature(s) of the call.

Figure 18:
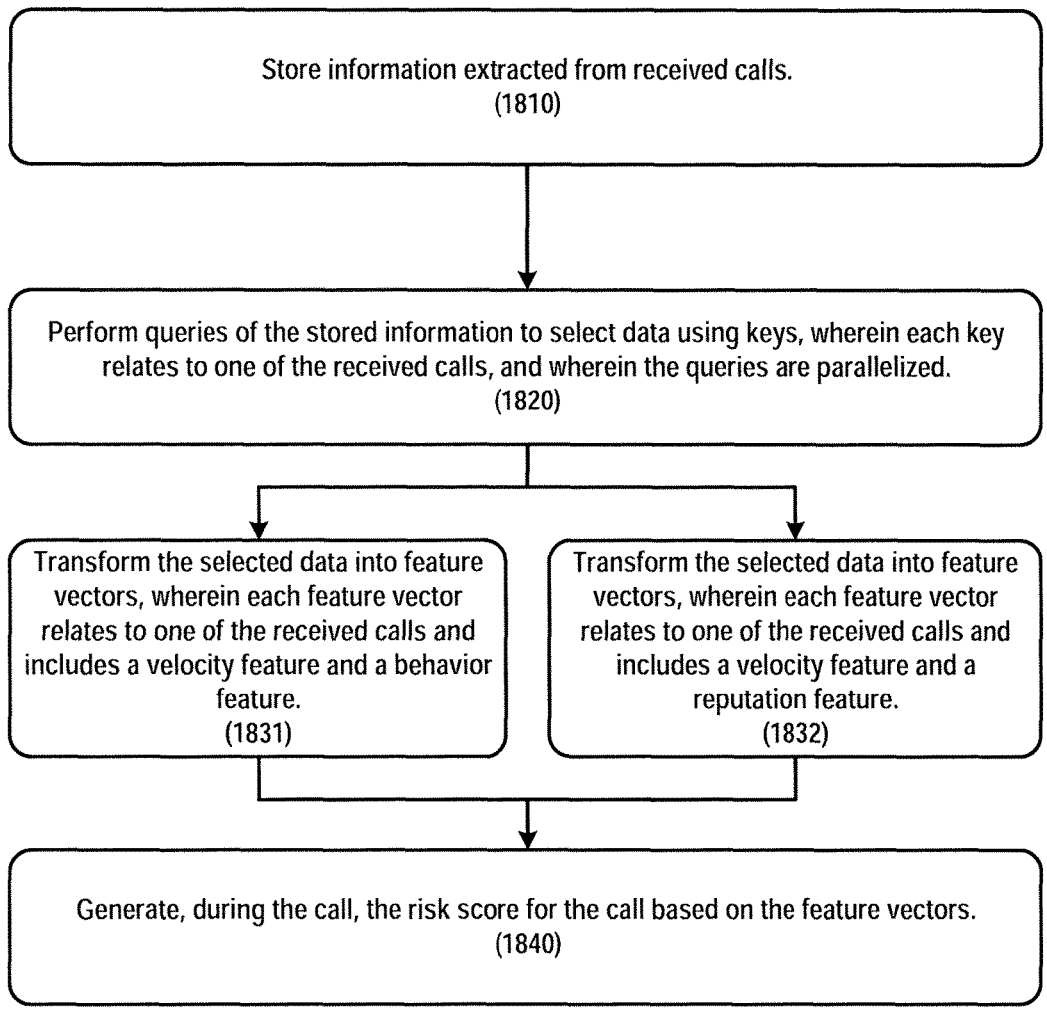
FIG. 18 is a block diagram illustrating a method for determining a risk score of a call according to one or more embodiments of the present invention.

FIG. 18 is a block diagram illustrating a method for determining a risk score of a call according to one or more embodiments of the present invention. First, information extracted from received calls is stored (1810). The information extracted from received calls may become a component of, or an input in the determination of, a reputation feature, a behavior feature, or a velocity feature. Second, queries of the stored information are performed (1820) to select data using keys, wherein each key relates to one of the received calls, and wherein the queries are parallelized. Third, in at least one embodiment, the selected data are transformed (1831) into feature vectors, wherein each feature vector relates to one of the received calls and includes a velocity feature and a behavior feature. In at least one embodiment different than the embodiment containing step 1831, the third step is as follows: the selected data are transformed (1832) into feature vectors, wherein each feature vector relates to one of the received calls and includes a velocity feature and a reputation feature. In at least one embodiment, the third step may be as follows: the selected data are transformed into feature vectors, wherein each feature vector relates to one of the received calls and includes a behavior feature, a velocity feature, and a reputation feature. Fourth, during the call, the risk score is generated (1840) for the call based on the feature vectors.

Figure 19:
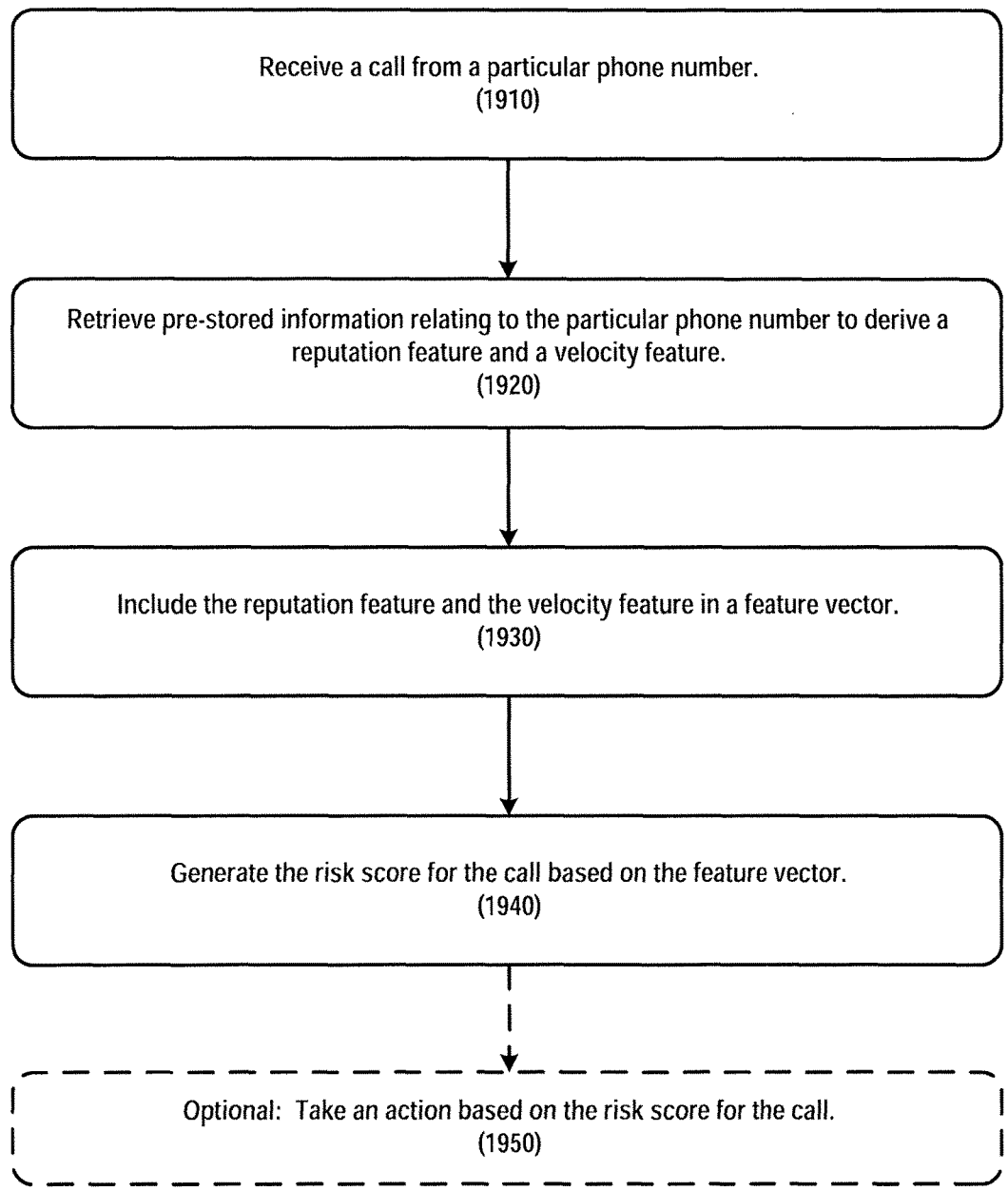
FIG. 19 is a block diagram illustrating a method for determining a risk score of a call according to one or more embodiments of the present invention.

FIG. 19 is a block diagram illustrating a method for determining a risk score of a call according to one or more embodiments of the present invention. First, a call from a particular phone number is received (1910). Second, pre-stored information relating to the particular phone number is retrieved (1920) to derive a reputation feature and a velocity feature. Third, the reputation feature and the velocity feature are included (1930) in a feature vector. Fourth, the risk score is generated (1940) for the call based on the feature vector. Optionally, an action may be taken (1950) based on the risk score of the call.

The velocity feature of the call may be, without limitation, any of the following features: a number of calls (e.g. from the originating phone number with one or more destination phone numbers specified); a duration of one or more calls (e.g. from an originating phone number with one or more destination phone numbers specified); a duration of time between calls or a periodicity between calls; a number of distinct unique identifiers or account identifiers (e.g. the number of account IDs associated with the originating phone number with respect to one or more institutions, e.g. one or more banks); a number of distinct unique identifiers associated with an account identifier (e.g. a number of distinct originating phone numbers associated with an account identifier, where the association might exist, for example, in the form of a relation in a relational database or, for example, is made as the result of a query against a non-relational database); a number of destinations called (e.g. a number of destination phone numbers called by an originating phone number); a sequence of calls or attempted calls from at least one originating phone number similar to an originating phone number of the call (e.g. a sequence of successfully and/or unsuccessfully connected calls from multiple phone numbers sharing an area code plus first three digits (210-555-6548, 210-555-4961, etc.) with an originating number of the call, wherein the originating number was 210-555-1234); or a number of times a specific activity in an IVR was performed (e.g. a number of times a PIN change or authentication attempt was made, whether during one call or during a plurality of calls).

The reputation feature of the call may be, without limitation, any of the following features: suspicious or malicious activity; a prior complaint (e.g. complaints lodged by third parties against the originating phone number); a device type (e.g. landline, cell, VoIP, softphone, or specific phone model which is the calling phone); a carrier (e.g. mobile carrier, VoIP service provider, or landline or PSTN carrier of the calling party); a route taken by the call prior to entering a telephone exchange; a route taken by the call after leaving a telephone exchange; or a location (e.g. base station or cell tower information).

Behavior features capture how a caller acts during one or more calls, particularly when interacting with an IVR system. The behavior feature of the call may be, without limitation, any of the following features: an action taken during interaction with an IVR system, an amount of time elapsed between actions taken during interaction with an IVR system (e.g. a timeout after the caller is prompted to enter a unique identifier), providing incorrect information to an IVR system (e.g. multiple incorrect entries when prompted for a unique identifier such as a social security number or a PIN), a number of times a specific activity in an IVR was performed (e.g. a number of times a PIN change or authentication attempt was made, whether during one call or during a plurality of calls), a number of times an IVR was called (e.g. an inordinate number of calls from one phone number or one user), a number of times an IVR was called during a measure of time (e.g. an inordinate number of calls from one phone number or one user in one day), a sequence of actions taken during interaction with an IVR system (e.g. a caller tried to reset a PIN number an unusually high number of times, or e.g., a sequence of actions in an IVR call flow that may be represented using an N-gram of high predictive value in a vector space model), a volume or a duration of at least one DTMF tone during interaction with an IVR system, an amount of time elapsed between DTMF tones, a use of voice during interaction with an IVR system (e.g. a caller provides speech input instead of DTMF tone(s) to respond to an IVR prompt), an amount of time elapsed between a beginning of an IVR prompt and a user's spoken response to the IVR prompt (e.g. whether the user listens to the entire prompt or speaks soon after the prompt begins may indicate prior knowledge of the IVR system's options), or an amount of time elapsed between an IVR prompt and an action taken during interaction with an IVR system (e.g. an inordinate amount of time between a prompt for a social security number and a user's response, also e.g., an unusually short period of time between an IVR prompt and a user's response may indicate a robot).

Figure 5:
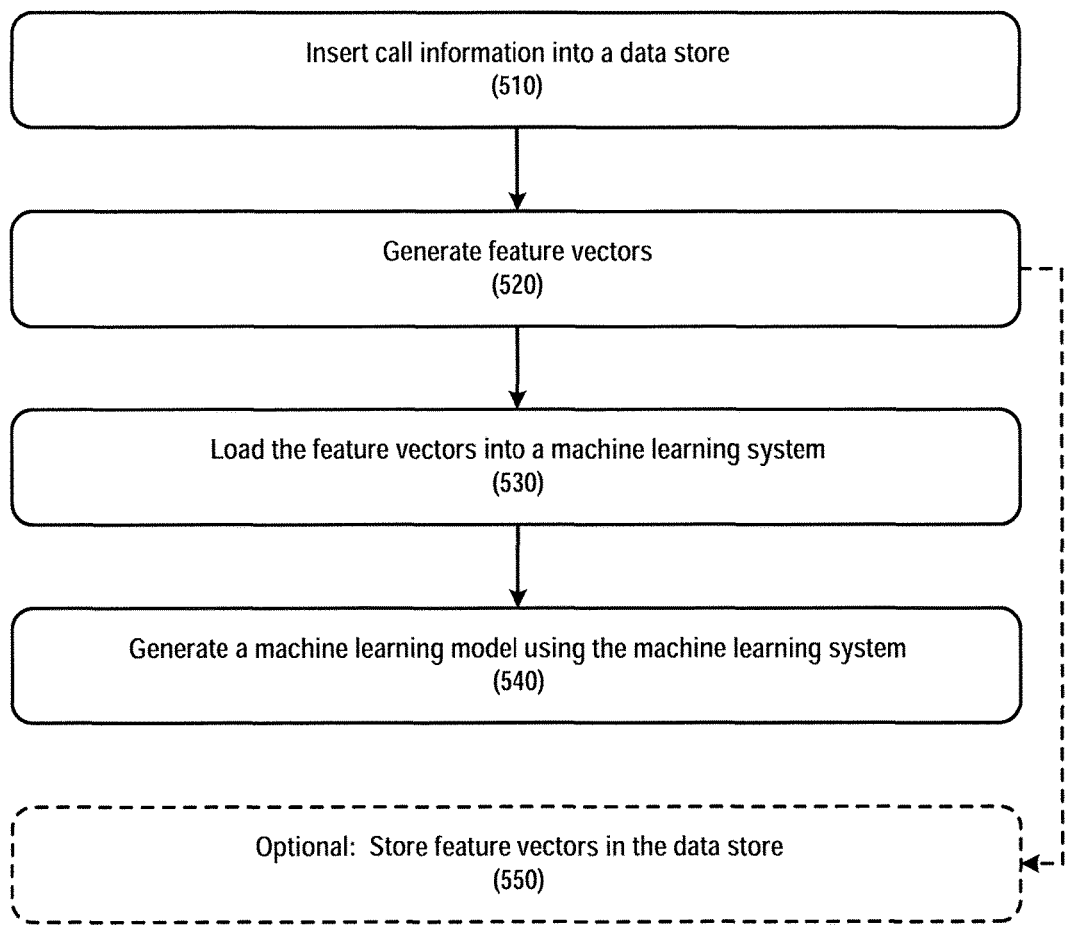
FIG. 5 is a block diagram illustrating a method for generating a machine learning model which may be used in determining a risk score of a call according to one or more embodiments of the present invention.

FIG. 5 is a block diagram illustrating a method for generating a machine learning model which may be used in determining a risk score of a call according to one or more embodiments of the present invention. First, call information is inserted (510) into a data store. Second, feature vectors are generated (520) from the call information. Third, the feature vectors are loaded (530) into a machine learning system. Fourth, a machine learning model is generated (540) using the machine learning system. The generated feature vectors may be loaded directly in the machine learning system without first storing them in the data store. Therefore, optionally, the feature vectors are stored (550) in the data store.

Figure 7:
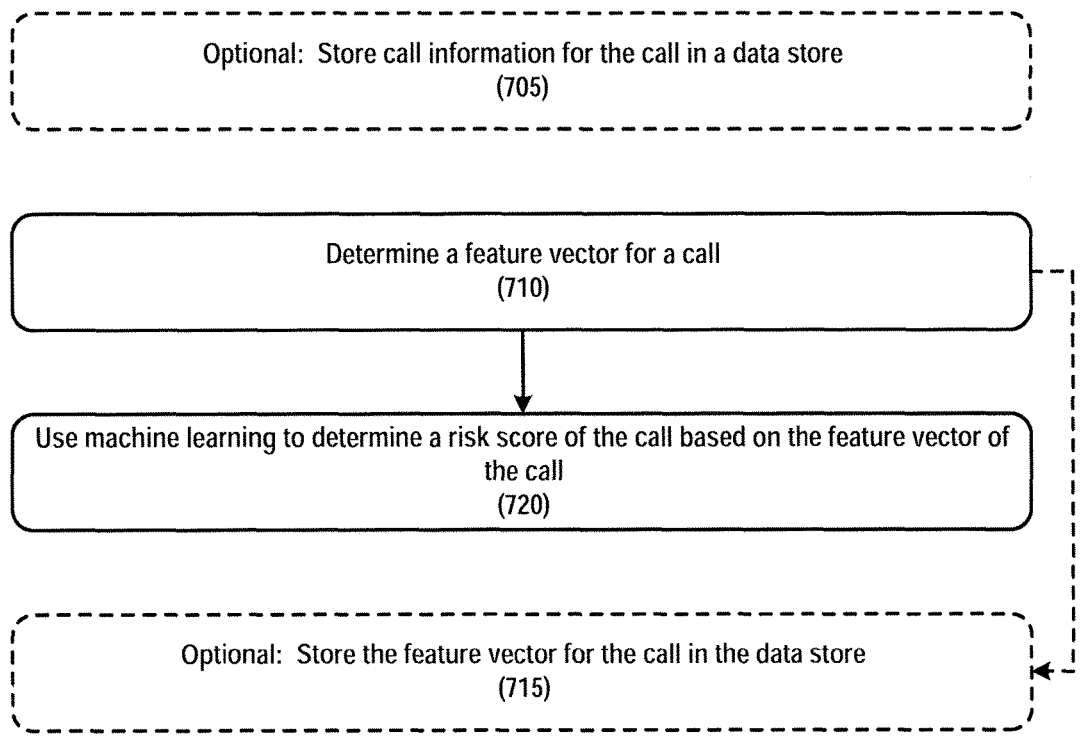
FIG. 7 is a block diagram illustrating a method for determining a risk score of a call according to one or more embodiments of the present invention.

FIG. 7 is a block diagram illustrating a method for determining a risk score of a call according to one or more embodiments of the present invention. First, a feature vector for a call is determined (710). Second, machine learning is used (720) to determine a risk score of the call based on the feature vector of the call. It may be possible to determine the risk score of the call in-memory. Storing call information for the call in a data store may be optional (705). Further, storing the feature vector for the call in the data store may also be optional (715).

Example: Calling Card Company

Figure 17:
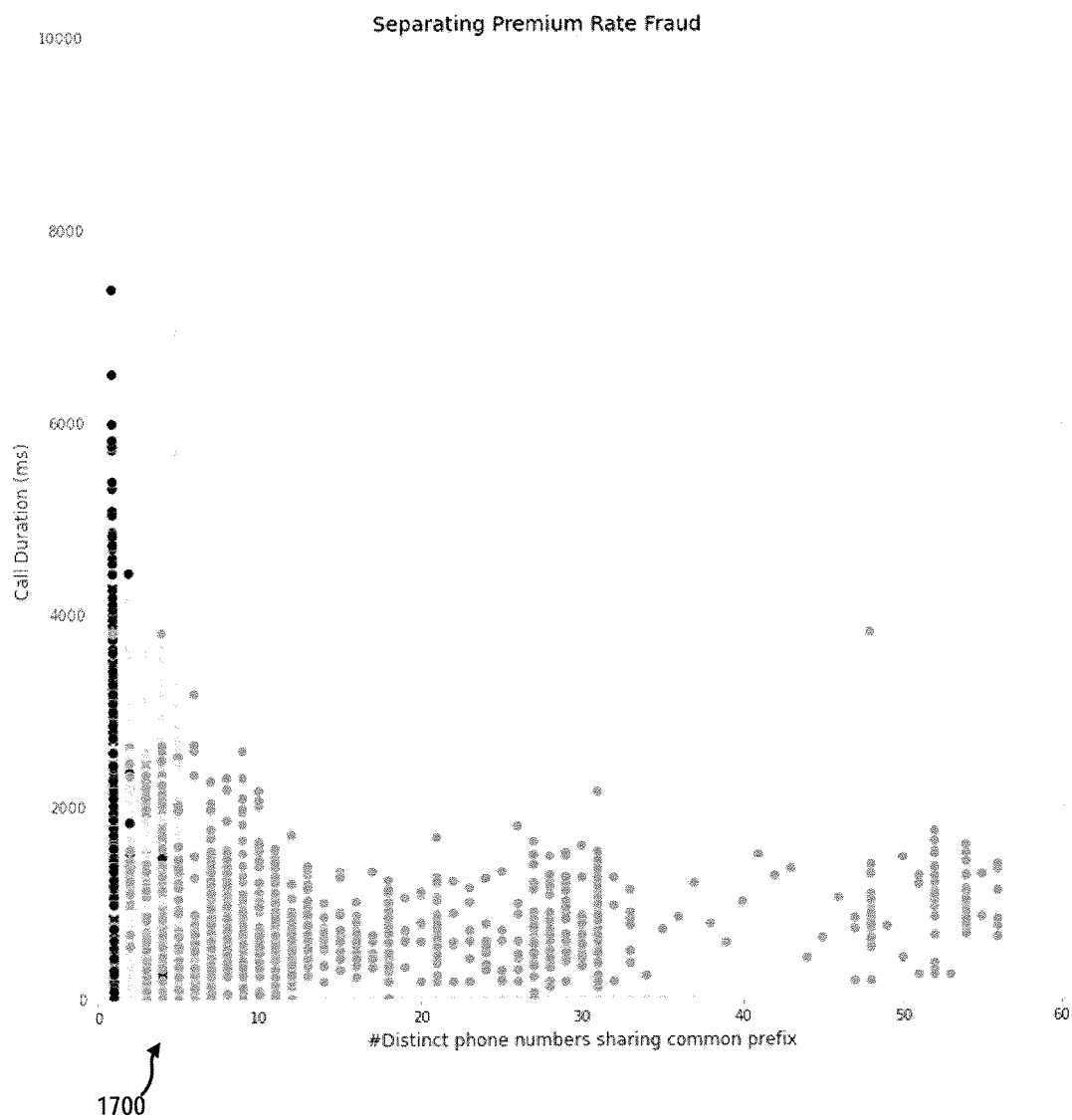
FIG. 17 is a chart of feature vectors for calls plotted in a feature space comprising call duration and an automatic number identification (ANI) scanning feature, with a region indicating fraudulent calls according to one or more embodiments of the present invention.

A major calling card company had a problem of premium rate fraud, wherein a bad actor uses stolen calling card numbers to make calls to fake premium numbers in other countries and then pockets the fees. It was determined that the bad actors were using automated robots, both to discover valid calling cards (ANI scanning), and to actually call using those cards. By designing features based on graph analysis, along with features capturing duration of calls, interval between successive calls, and periodicity of calls from a source, over 80% of the premium rate fraud was detected, in some cases, up to ten days before actual fraud calls. A custom feature was created to detect ANI scanning by identifying sequences of attempted calls using similar ANIs. The custom ANI scanning feature identified approximately 50% of the premium rate fraud, as shown in the chart (1700) in FIG. 17.

CDR Analysis at Scale

In at least one embodiment of the present invention, Python data science tools such as pandas and IPython were used to generate CDR and IVR call flow features. This required that only a sample of the larger dataset be processed. MongoDB was used to store CDR data and to query for features used to build risk prediction models. This implementation enabled the building of prediction models using more than 100 million records.

MongoDB was chosen based on several requirements. It has a Python driver known as PyMongo that interoperates with the Python data science stack. It is schemaless or document-oriented or non-relational and therefore can ingest CDR data with arbitrary formats. MongoDB, like many data stores, provides a bulk insert API that allows for insertion of thousands of CDRs in a single API call. Finally, MongoDB's Aggregation API provides a flexible search API that supports query parallelism and horizontal scalability ("sharding").

Data Ingest

A key determinant of write throughput is the "write concern" setting. Write concern describes the guarantee that MongoDB provides when reporting on the success of a write operation. Operationally this means the greater the guarantee, the slower the insertion throughput. The "journaled write concern" was used for bulk insert operations to guarantee that CDRs are fully committed to disk after each insert. For updates, the "acknowledged write concern" was used, which simply guarantees the database server received the request. For a single node MongoDB cluster and the aforementioned settings, insert speeds of 8000 records per second and updates of 1000 records per second were realized.

Generating CDR and IVR Features

Figure 10:
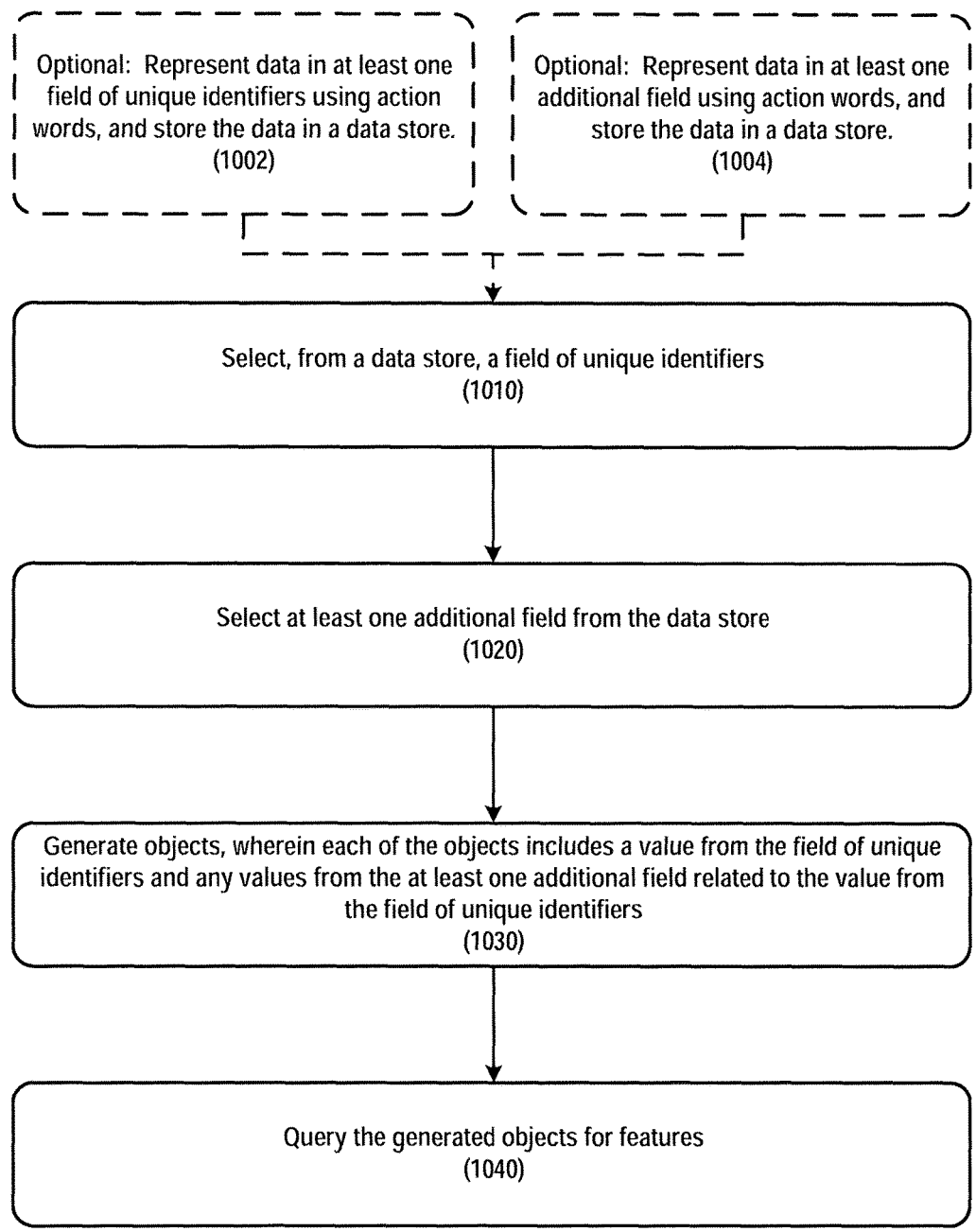
FIG. 10 is a block diagram illustrating a method for generating features according to one or more embodiments of the present invention.

FIG. 10 is a block diagram illustrating a method for generating features according to one or more embodiments of the present invention. First, a field of unique identifiers is selected (1010) from a data store. Second, at least one additional field is selected (1020) from the data store. Third, objects are generated (1030), wherein each of the objects includes a value from the field of unique identifiers and any values from the at least one additional field related to the value from the field of unique identifiers. Fourth, the generated objects are queried (1040) for features. Each unique identifier may be related to one or more values from the additional field, and feature vectors may comprise these values along with their related unique identifier. Optionally, before the field of unique identifiers is selected from the data store, data in at least one field of unique identifiers may be represented (1002) using action words, and the data may be stored (1002) in a data store. Optionally, before the field of unique identifiers is selected from the data store, data in at least one additional field may be represented (1004) using action words, and the data may be stored (1004) in a data store. A supervised classifier may be defined in a feature space that includes the dimensions of the at least one additional field.

Figure 11:
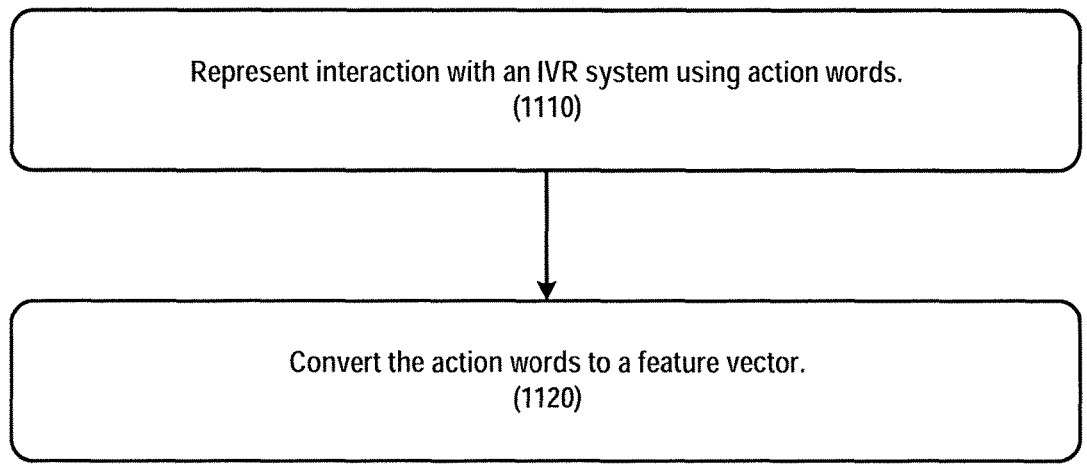
FIG. 11 is a block diagram illustrating a method for generating features according to one or more embodiments of the present invention.

FIG. 11 is a block diagram illustrating a method for generating features according to one or more embodiments of the present invention. First, interaction with an IVR system is represented (1110) using action words. Second, the action words are converted (1120) to a feature vector. A supervised classifier may be defined in a feature space that includes at least some of the dimensions of the feature vector.

In at least one embodiment of the present invention, feature vectors including behavior features may be collected from a plurality of prior calls from a same phone number. The feature vectors including behavior features from the plurality of prior calls from the phone number may be used to train a machine learning model or fingerprint representing the phone number. A call from the phone number may be converted to a feature vector that may be compared against the machine learning model representing the phone number to determine a risk score for the call, or the call may be combined with other calls to form a feature vector that may be compared against the machine learning model representing the phone number to detect a malicious actor.

In at least one embodiment of the present invention, feature vectors including behavior features may be collected from calls having a certain label from a plurality of phone numbers. The certain label may be obtained from user feedback, including feedback regarding a false positive or a false negative. The certain label may be added by human supervision, including expert supervision. The certain label may be a label from a finite set of labels, e.g. {fraud, not_fraud} or {human, robot}. The feature vectors including the behavior features may be used to train a machine learning model representing the certain label. A call may be converted to a feature vector that may be compared against the machine learning model representing the certain label to determine a risk score for the call.

In at least one embodiment of the present invention, feature vectors including behavior features may be collected from labeled calls, wherein at least one of the labeled calls has a first label and at least one of the labeled calls has a second label. The first label may represent genuineness, including human, not fraudulent, and/or not malicious, and the second label may represent non-genuineness, including robot, fraud, and/or malicious action. The feature vectors including behavior features may be used to train a machine learning model representing the first label and the second label. A call may be converted to a feature vector that may be compared against the machine learning model representing the first label and the second label to determine a risk score for the call.

The Aggregation Framework provides a flexible API to query for IVR and CDR features used to build risk prediction models. FIG. 8 shows a simple query to count the number of unique accounts associated with a particular phone number.

Aggregation queries are constructed as a data processing pipeline. Line 2 selects "ANI" and "ACCOUNT_ID" fields from the records. Lines 3-7 generate group objects where the key is "ANI" and the value is a set of unique account numbers. Line 8 generates a Cartesian product between "ANI" and "ACCOUNT_ID". Finally, line 9 generates group objects where the key is "ANI" and value is COUNT of "ACCOUNT_ID".

The PyMongo API is thread-safe, and therefore the Aggregation queries may be parallelized using multiprocessing.dummy.pool. The pool distributes queries into groups of ANIs to be queried by each thread concurrently. Each added thread provided a linear reduction in query latency.

Storing Feature Vectors

The IVR and CDR features collected from queries may be used to generate risk prediction models using scikit-learn. MongoDB may be used to store normalized feature vectors as binary JavaScript Object Notation (BSON, i.e. binary JSON) data. This allows prediction processes to reuse the feature vectors for subsequent experiments.

FIG. 9 demonstrates how to store feature vectors to MongoDB in a PyMongo environment. Lines 4 and 6 of FIG. 9 serialize a document "X" including n training samples and a document "y" including n labels, which are represented as binary data via lines 3 and 5 and then stored to a collection "cdr" in line 2.

An action may be taken based on the risk score for a call. The action taken may be displaying, during the call, the risk score on a display such as a monitor, a display on a phone, a smartphone, or a tablet. The action taken may be storing the risk score in a database during the call. The action taken may be altering, during the call, an IVR call flow based on the risk score. For example, if the call were deemed fraudulent, the IVR may ask the caller to update an address. The action taken may be notifying the police or an owner of an IVR system in response to the risk score. The action taken may be disabling a feature in an IVR system during the call in response to the risk score. For example, a PIN change menu or a withdrawal option may become unavailable to the caller. The action taken may be locking down an IVR system in response to a risk score. That is, the IVR system may no longer respond to any calls or may no longer offer certain options like PIN change or withdrawal to any callers. The lock down may continue until the fraud is investigated and/or a determination is made as to how the fraud was perpetrated. The action taken may be requiring alternative identification during the call in response to a risk score. For example, answers to security questions, a PIN number, an address, a driver license number, or a social security number may be requested. The action taken may be requesting additional information during the call, and the additional information may be used to create or update a profile concerning the caller or the phone number of the caller.

Figure 6:
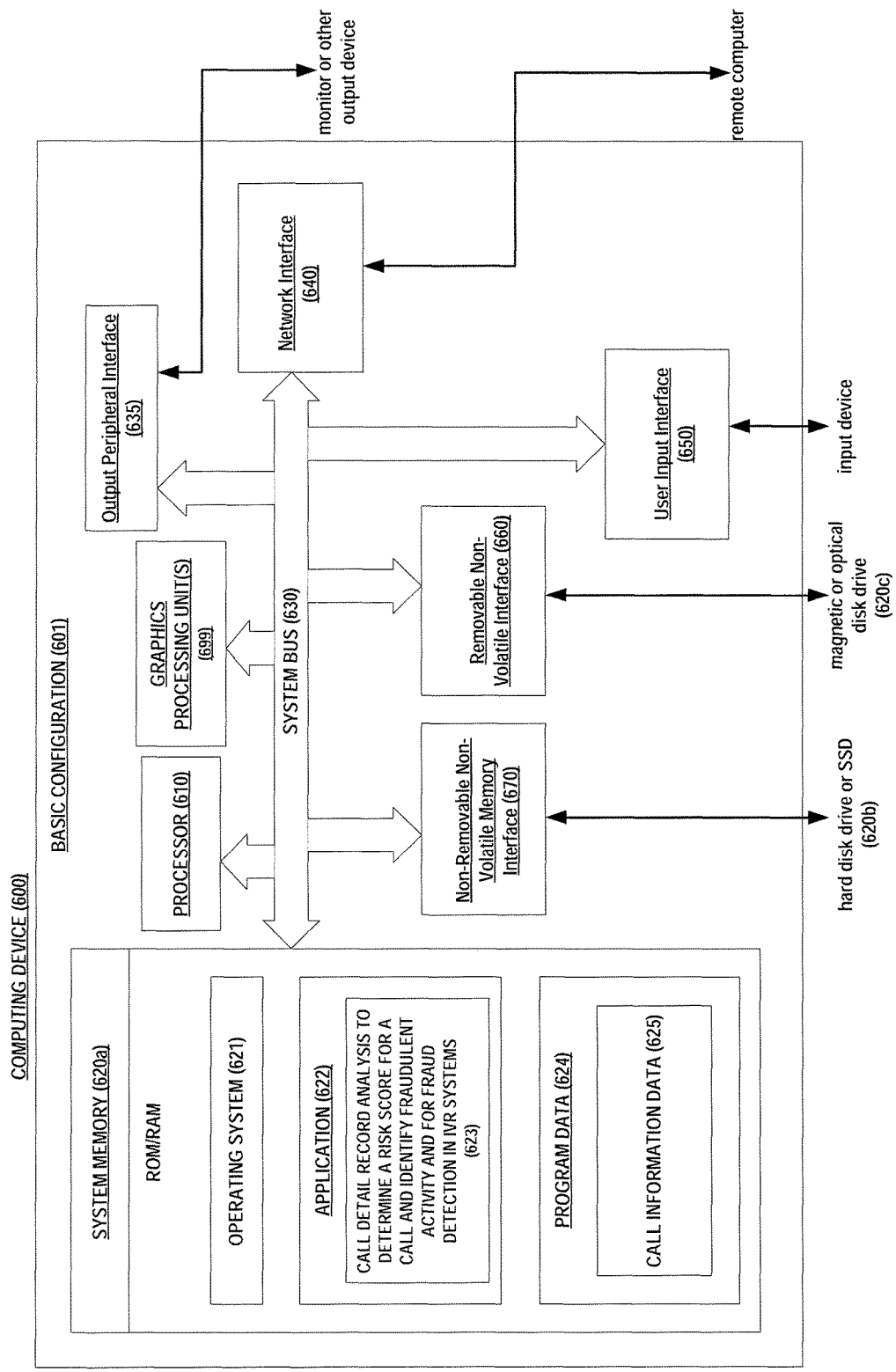
FIG. 6 is a block diagram illustrating an example computing device.

FIG. 6 is a high-level block diagram of an example computer (600) that is arranged call detail record analysis to determine a risk score for a call and to identify fraudulent activity and/or for fraud detection in IVR systems. In a very basic configuration (601), the computing device (600) typically includes one or more processors (610) and system memory (620). A system bus (630) can be used for communicating between the processor (610) and the system memory (620).

Depending on the desired configuration, the processor (610) can be of any type including but not limited to a microprocessor (μP), a microcontroller (μC), a digital signal processor (DSP), or any combination thereof. The processor (610) can include one more levels of caching, a processor core, and registers. The processor core can include an arithmetic logic unit (ALU), a floating point unit (FPU), a digital signal processing core (DSP Core), or any combination thereof. A memory controller can also be used with the processor (610), or in some implementations the memory controller can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a system and method for call detail record analysis to determine a risk score for a call and identify fraudulent activity and for fraud detection in IVR systems. Program Data (624) includes storing instructions that, when executed by the one or more processing devices, implement a system and method for call detail record analysis to determine a risk score for a call and identify fraudulent activity and for fraud detection in IVR systems (623). In some embodiments, the application (622) can be arranged to operate with program data (624) on an operating system (621). Program data (624) includes call information data (625). Call information data (625) may include uninitialized variables and arguments to parameters for methods appropriate to implement the systems and methods described herein.

The computing device (600) can have additional features or functionality, and additional interfaces to facilitate communications between the basic configuration (601) and any required devices and interfaces, such non-removable non-volatile memory interface (670), removable non-volatile interface (660), user input interface (650), network interface (640), and output peripheral interface (635). A hard disk drive or solid state drive (SSD) may be connected to the system bus (630) through a non-removable non-volatile memory interface (670). A magnetic or optical disk drive may be connected to the system bus (630) by the removable non-volatile interface (660). A user of the computing device (600) may interact with the computing device (600) through input devices such as a keyboard, mouse, or other input peripheral connected through a user input interface (650). A monitor, printer, speaker or other output peripheral device may be connected to the computing device (600) through an output peripheral interface (635) in order to provide output from the computing device (600) to a user or another device.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (600). Any such computer storage media can be part of the device (600). One or more graphics processing units (GPUs) (699) may be connected to the system bus (630) to provide computing capability in coordination with the processor (610), especially where single instruction, multiple data (SIMD) problems are present.

The computing device (600) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations. Additionally, the computing device (600) may operate in a networked environment where it is connected to one or more remote computers over a network using the network interface (650).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk (620c), a hard disk drive (620b), a solid state drive (SSD) (620b), a Compact Disc (CD) (620c), a Digital Video Disk (DVD) (620c), a Blu-ray disc (BD) (620c), a digital tape (620c), a computer memory (620a), etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for determining a risk score of a call received by an Interactive Voice Response (IVR) system, the computer-implemented method comprising:
   creating a feature vector based on interaction with the IVR system during the call; and
   using a machine learning model to determine the risk score of the call based on the created feature vector,
   wherein the created feature vector is based on a behavior feature of the call, and wherein the behavior feature of the call is a sequence of actions taken during interaction with an IVR system, wherein the behavior feature of the call is at least one of an action taken during interaction with an IVR system, an amount of time elapsed between actions taken during interaction with an IVR system, providing incorrect information to an IVR system, a number of times a specific activity in an IVR was performed, a number of times an IVR was called during a measure of time, a volume or a duration of at least one DTMF tone during interaction with an IVR system, an amount of time elapsed between DTMF tones, a use of voice during interaction with an IVR system, an amount of time elapsed between a beginning of an IVR prompt and a user's spoken response to the IVR prompt, or an amount of time elapsed between an IVR prompt and an action taken during interaction with an IVR system.

2. The computer-implemented method of claim 1, further comprising:
representing prior calls as feature vectors;
labeling the feature vectors representing the prior calls; and
training the machine learning model using the labeled feature vectors.

3. The computer-implemented method of claim 1, wherein information regarding the call is stored in a database before the using a machine learning model to determine the risk score of the call based on the created feature vector.

4. The computer-implemented method of claim 3, wherein information regarding the call is retrieved from the database before the using a machine learning model to determine the risk score of the call based on the created feature vector.

5. The computer-implemented method of claim 2, wherein information regarding the prior calls is stored in a non-relational database.

6. The computer-implemented method of claim 2, wherein the prior calls are all from a same phone number.

7. The computer-implemented method of claim 2, wherein the prior calls are from a plurality of phone numbers, and wherein each of the labeled feature vectors used to train the machine learning model has a same label as each of the other labeled feature vectors used to train the machine learning model.

8. The computer-implemented method of claim 2, wherein the labeling the feature vectors representing the prior calls is done using a first label representing genuineness and a second label representing non-genuineness.

9. The computer-implemented method of claim 2, wherein the representing prior calls as feature vectors includes representing interaction with an IVR system using action words.

10. The computer-implemented method of claim 2, wherein the representing prior calls as feature vectors includes:
representing interaction with an IVR system using action words in a document; and
converting the document to a feature vector.

11. The computer-implemented method of claim 2, wherein the representing prior calls as feature vectors includes representing interaction with an IVR system using at least one of N-grams or skip N-grams.

12. The computer-implemented method of claim 2, wherein the representing prior calls as feature vectors includes determining an inverse document frequency.

13. The computer-implemented method of claim 1, further comprising taking an action based on the risk score of the call.

14. The computer-implemented method of claim 13, wherein the taking an action based on the risk score of the call includes at least one of displaying the risk score on a display during the call, storing the risk score in a database during the call, altering an IVR call flow during the call, notifying police, or notifying an owner of an IVR system.

15. The computer-implemented method of claim 13, wherein the taking an action based on the risk score of the call includes at least one of altering an IVR call flow during the call, disabling a feature in the IVR system during the call, locking down the IVR system, requiring alternative identification during the call, or requesting additional information during the call.

16. The computer-implemented method of claim 1, wherein the interaction with the IVR system includes responses to the IVR system represented using action words.

17. An apparatus that determines a risk score of a call received by an Interactive Voice Response (IVR) system, the apparatus comprising:
at least one processor; and
a non-transitory computer readable medium coupled to the at least one processor having instructions stored thereon that, when executed by the at least one processor, causes the at least one processor to:
create a feature vector based on interaction with the IVR system during the call; and
use a machine learning model to determine the risk score of the call based on the created feature vector,
wherein the created feature vector is based on a behavior feature of the call, and wherein the behavior feature of the call is a sequence of actions taken during interaction with an IVR system,
wherein the behavior feature of the call is at least one of an action taken during interaction with an IVR system, an amount of time elapsed between actions taken during interaction with an IVR system, providing incorrect information to an IVR system, a number of times a specific activity in an IVR was performed, a number of times an IVR was called during a measure of time, a volume or a duration of at least one DTMF tone during interaction with an IVR system, an amount of time elapsed between DTMF tones, a use of voice during interaction with an IVR system, an amount of time elapsed between a beginning of an IVR prompt and a user's spoken response to the IVR prompt, or an amount of time elapsed between an IVR prompt and an action taken during interaction with an IVR system.

* * * * *